United States Patent [19]
Ortiz Perez et al.

[11] Patent Number: 5,966,428
[45] Date of Patent: *Oct. 12, 1999

[54] SELF DIAGNOSTIC SYSTEM FOR CELLULAR-TRANSCEIVER SYSTEMS WITH REMOTE-REPORTING CAPABILITIES

[75] Inventors: Luis R. Ortiz Perez, Rio Piedras; Alexis Torres Ramos, Carolina, both of Puerto Rico

[73] Assignee: Telular Corp., Vernon Hills, Ill.

[*] Notice: This patent is subject to a terminal disclaimer.

[21] Appl. No.: 09/160,995

[22] Filed: Sep. 25, 1998

Related U.S. Application Data

[63] Continuation of application No. 08/505,868, Jul. 24, 1995, Pat. No. 5,859,894.
[51] Int. Cl.⁶ .......................... H04M 3/08; H04M 11/00; H04M 3/22
[52] U.S. Cl. .................. 379/27; 379/1; 379/32; 455/425
[58] Field of Search ................... 379/27, 29, 32, 379/34, 5, 1, 6; 455/423, 424, 425, 67.1, 67.4

[56] References Cited

U.S. PATENT DOCUMENTS

| 5,295,178 | 3/1994 | Nickel et al. | 379/425 |
| 5,504,800 | 4/1996 | Yehushua et al. | 379/27 |
| 5,781,856 | 7/1998 | Jacobs et al. | 455/425 |
| 5,819,177 | 10/1998 | Vucetic et al. | 455/425 |

*Primary Examiner*—Paul Loomis
*Attorney, Agent, or Firm*—Hamman & Benn

[57] ABSTRACT

A self-diagnostic system for a checking all functions of a cellular-transceiver system having a cellular-interface unit, which interface unit couples a standard telephone set to a cellular transceiver, which interface unit converts the DTMF or pulse-type of dialing signals into digital format for transmission to the cellular transceiver, whereby the dialed number made on the land-type of telephone may be used to call a number over the cellular system. The present invention not only monitors and checks the proper functioning of the transceiver and associated power supply, and the like, but will also monitor and check the interface unit, and report the results to an off-site monitoring center by means of the cellular network.

20 Claims, 24 Drawing Sheets

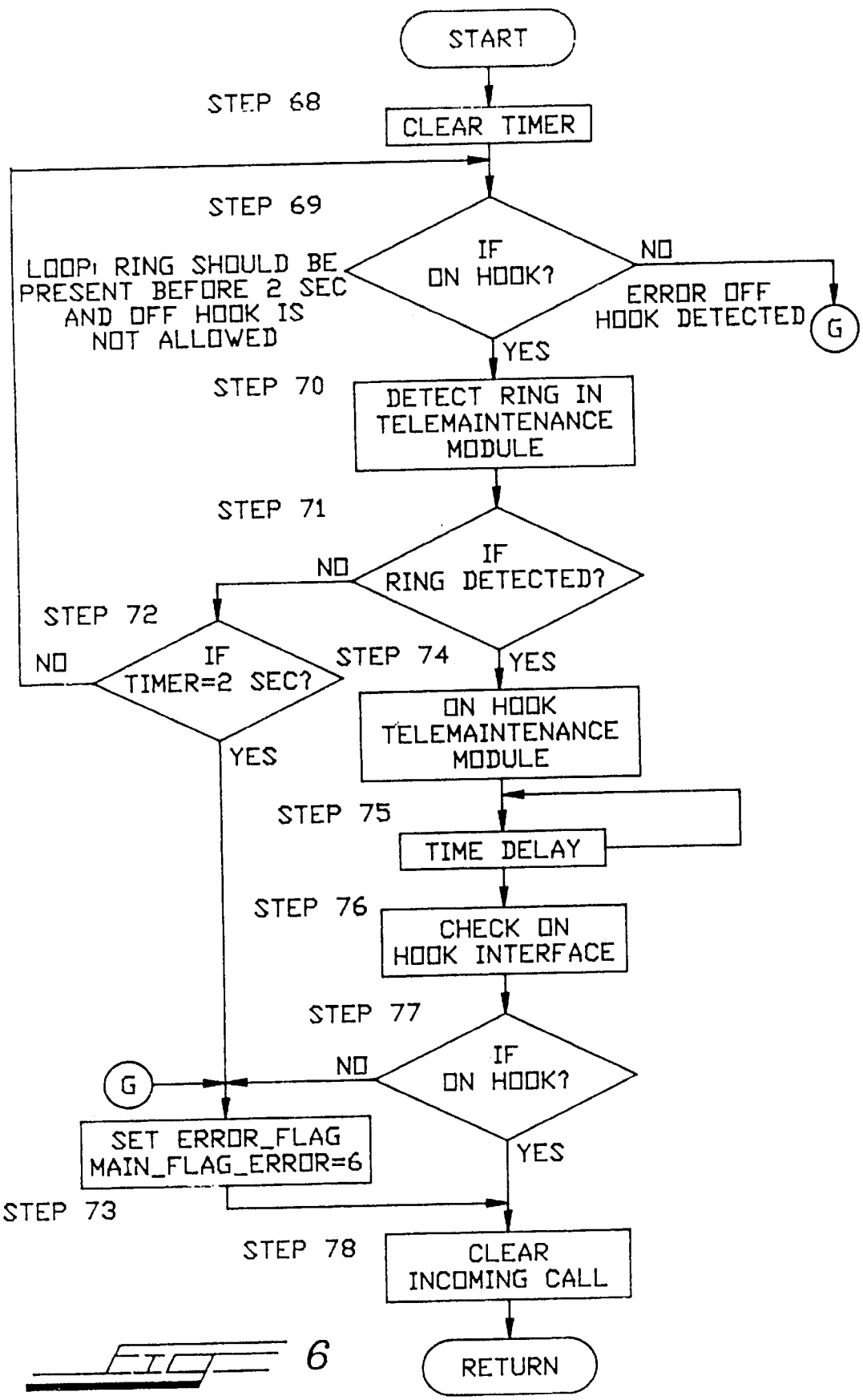

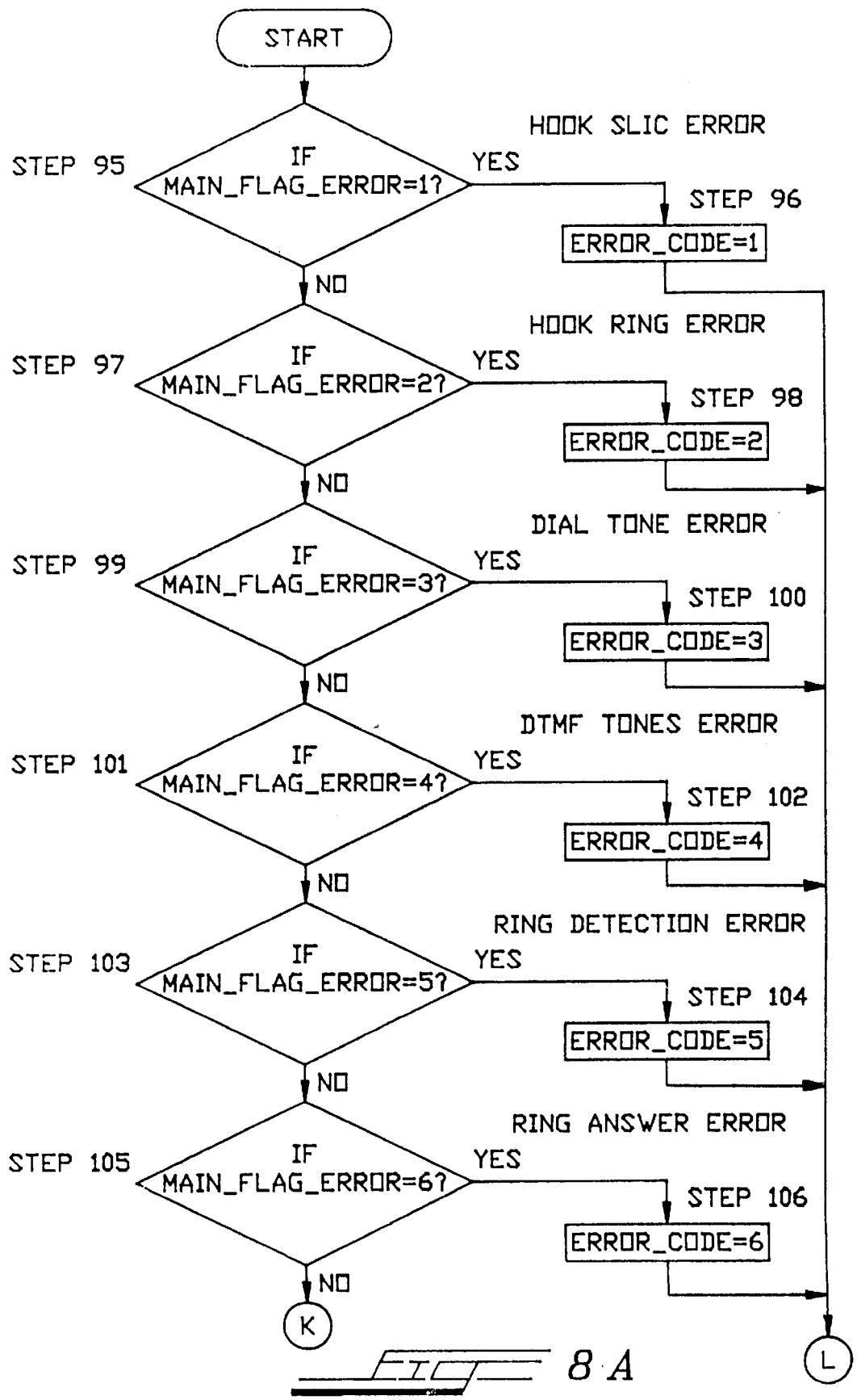

SELF DIAGNOSTIC SYSTEM FOR CELLULAR-TRANSCEIVER SYSTEMS WITH REMOTE-REPORTING CAPABILITIES

This is a continuation of application Ser. No. 08/505,868 filed on Jul. 24, 1995, now U.S. Pat. No. 5,859,894.

A portion of the disclosure of this patent document contains material which is subject to copyright protection. The copyright owner has no objection to facsimile reproduction by anyone of the patent document or the patent disclosure, as it appears in the Patent & Trademark Office patent file or records, but otherwise reserves all copyright rights whatsoever.

BACKGROUND OF THE INVENTION

The present invention is directed to a self-diagnosis system for checking all functions of a cellular-transceiver system. The present invention has especial relevance to a cellular-interface system, such as that disclosed in U.S. Pat. Nos. 4,658,096 and 4,737,975, which are incorporated by reference herein. In the systems of these patents, an interface unit couples a standard telephone set, facsimile machine, modem, or other communications devices, to a cellular, or cellular-like, transceiver, which interface unit allows for normal operation of the communications device through the radio transceiver. The interface unit may also convert DTMF or pulse-type of dialing signals into digital format for transmission to the radio transceiver, whereby the dialed number made may be used to call a number over the radio system by means of the transceiver. The system of the invention tests for the proper operation of all functions of the adapter interface unit, as well other characteristics, such as the power output of the radio transceiver, which can be varied by either signals from the transceiver or from the radio network, or the frequency at which the transceiver is utilizing, which can be changed selectively by either the transceiver or the cellular network.

The diagnostic and testing system of the present invention may be used in any cellular-like system, such as a pure cellular system, or cellular-like systems, such ISDN and other personal communication systems, where a cellular-like adapter or interface unit is provided for converting the DTMF or pulse-type of dialing signals into digital format for transmission to the cellular-like transceiver associated with the cellular-like system.

It is known to provide diagnostic and testing equipment for entire cellular systems. It is also known to provide a self-contained unit that tests itself. The latter is disclosed in U.S. Pat. No. 5,016,269—Rogers, which is incorporated by reference herein, which discloses a cellular-telephone, emergency call-box. This patent discloses self-diagnostics that are performed by the call-box itself. The call-box of this patent has self-diagnostics within it, and periodically reports the status of items checked to a central station through the cellular network. Rogers discloses a cellular handset and transceiver and associated auto-diagnostic system for checking on the system and for reporting back to a central station. However, this patent does not disclose the monitoring and self-diagnostic function of a DTMF converter, such as used in the above-mentioned U.S. Pat. Nos. 4,658,096 and 4,737,975, nor does Rogers disclose the initiation of a ring-back tone from the central office to check on proper working of the system.

The types of cellular-like systems, besides the pure-type of cellular systems, in which the present invention may be used, are those that relate generally to a wireless digital personal communications systems having a plurality of intelligent base stations and intelligent portable handset terminals, each having a predetermined radio cell coverage area, and more particularly to a digital, radio cell, radio-telephone, personal communications system (or PCS) having a full ISDN interface, thereby facilitating direct interconnection and switching of PCS call traffic through the ISDN interface and the public switched telephone network, or any switched network, the personal communications system having voice/data/image (or any combination thereof) and two-way full-duplex incoming and outgoing calling capability, and being fully operational and compatible with any modulation approach selected, with the intercell protocol hand-off being provided through distributed logic which is implemented in software that is resident in the intelligent portable handset terminals, the intelligent base stations, and the public switched telephone network (or any switched network) equipped with a PCS service control data base.

The increasing availability of mobile and portable communications over the past decade is freeing business and residential users from the physical constraints of a totally wired telecommunications network. Particularly, cellular communications systems, together with paging and other complementary services, brought true mobility to telecommunications services for the first time. Significant technical advances in mobile and portable technologies, as well as in new technologies such as digital transmission with respect to wireless telecommunications, have substantially expanded the number and types of wireless telecommunications services using the radio spectrum that can be made available to the user. These prospective services include, but are not limited to, advanced forms of cellular telephone service, advanced digital cordless telephone service, portable facsimile services, wireless centrex, wireless private branch exchange services, and wireless local area network services, and may be used through the existing public switched network or through alternative local wired networks (such as cable television systems). As such, digital personal communications systems can exist independently of, and in conjunction with, local wired networks, filling gaps that are existing in current communications systems, and also in creating new markets, many of which are yet to be defined. The advent of PCS will have a great impact on the future development and configuration of all telecommunications networks by significantly improving their flexibility and functionality. Accordingly, providers of PCS will have the ability to reach and serve existing and new markets nationally in an economic and responsive manner.

Personal communications requirements in the United States are rapidly changing as the demand for instantaneous communications increases due to increased mobility of the user. One of the advantages of PCS is that it will use a single communications device to reach anyone, anytime, anywhere. PCS will facilitate increased mobility and flexibility of the user, since this approach solves the underlying problem of being in constant communications with user. PCS wireless will enable users not to miss important calls, as well as reduce the time and expense in returning calls. PCS combines the functionality of radio and the Public Switched Telephone Network (PSTN) technologies and infrastructure, and will accommodate full-duplex capabilities (two-way incoming and outgoing calling) and hand-off between radio cells (allowing users to freely move from one radio cell to another without interrupting the user's call). It is important to remember that there has been a steady increasing demand for new PCS services and technologies for numerous, some-times incompatible, applications, namely, wireless private branch exchanges, smaller lighter portable cellular phones, portable fax machines, multi-channel cordless telephones, and additional services which are targeting the facilitation of contacting a particular individual user (rather than contacting a particular station). Current radio equipment and related services presently offered (i.e., cordless telephones, radio paging, and cellular radio) cannot fully meet the demands for these new types of PCS services. For example, cordless telephones are used in and around the home or office, operate on only a very few channels (10 or so) that are congested, and are limited to use in the immediate vicinity of their associated base station. Radio paging services are only one-way and have limited capabilities. Cellular and specialized mobile radio services cannot meet the full range of expected demand for PCS. Over time, PCS will have standardized equipment with common modules in hardware resulting in improved reliability in the associated equipment which will also be less vulnerable to transient interference from external sources, have automatic call registration, automatic call forwarding, voice mail, faxing capability, easy roaming features, remote data transfer, increased privacy protection/caller ID/class services, increased battery life, and common protocols. In order to best fulfill this marketplace mandate, a digital PCS is a necessity. Wireless PCS may eventually eliminate the need to have a building hard-wired for communications. Generally speaking, PCS will facilitate communications equipment with additional features. A digital PCS will facilitate improvements in technical communications equipment, systems and design.

The present invention, therefore, may be used in those ISDN or other PCS systems where there is provided a cellular-type adapter or interface board that allows for the use of a standard, land-type telephone instrument in this system, or other communications device, by converting the DTMF or pulse signals thereof into digital format that may be sent to a PCS transceiver unit, or by providing other functions that may be specific to the system. For example, in dedicated alarm systems where only outgoing calls are made by the radio transceiver, the interface unit need not provide ring generation, busy signal generation, and the like. Alternatively, in those systems where only incoming calls are required, the interface unit need not convert dialed DTMF or pulse signals into digital format. Such a PCS-cellular adapter also provides all of the other functions required, such as the generation of dial tone, ringing, and the like, as the cellular interface board set forth in U.S. Pat. Nos. 4,658,096 and 4,737,975.

SUMMARY OF THE INVENTION

It is, therefore, the primary objective of the present invention to provide a self-diagnostic system for a checking all functions of a cellular-transceiver system having a cellular-interface unit, which interface unit couples a standard, land-like telephone set, or other communications device, to a cellular transceiver, or to a cellular-like, such as a PCS or ISDN transceiver, which interface unit converts the DTMF or pulse-type of dialing signals into digital format for transmission to the cellular, or cellular-like, transceiver, whereby the dialed number made on the land-type of telephone instrument, or its equivalent, may be used to call a number over the cellular, or cellular-like, system. The present invention not only monitors and checks the proper functioning of the cellular, or cellular-like, transceiver and associated power supply, and the like, but will also monitor and check the cellular, or cellular-like, interface unit, and report the results to an off-site monitoring center by means of the cellular, or cellular-like, network.

The testing apparatus of the invention is capable of being coupled to an interface unit which couples a communications device to a radio transceiver for either calling out or receiving calls through the radio transceiver, the testing apparatus having its own diagnostics for monitoring and reporting the proper functioning of the interface unit.

The testing apparatus alternately couples the diagnostics to the interface unit, which said diagnostics simulates the functions performed by a communications device, such as a land line telephone, facsimile machine, modem, and the like, for generating in the interface unit respective, corresponding responses in the interface unit, in order to determine if the interface unit is operating correctly.

The testing apparatus will also generate an off-hook signal to the interface unit, as well as detect the presence of a dial-tone signal generated from the interface unit in response to the of the off-hook signal.

The testing apparatus will also generate a DTMF signal and send the signal to the interface unit, as well as detecting the DTMF signal output by the interface unit in response to the DTMF signal generated.

The testing apparatus also generates an on-hook signal to the interface unit, as well as an off-hook signal to the interface unit during the time that the interface unit is generating its ring-signal, in order to determine that the interface unit properly disconnects the ring-signal upon the answering of an incoming telephone call. The testing apparatus also generates an outgoing telephone call through the telephone network, when said interface unit is coupled to a transceiver, and back to the transceiver, whereby the diagnostics causes the transceiver to make a telephone call to itself, with the diagnostics detecting the generation of a busy-signal by the transceiver in response to the telephone call.

The testing may be initiated from a remote, telemaintenance center by means of a signal to a remote-reporting section of the auto-diagnostic unit. After the testing has been completed, the results are transmitted to the remote, telemaintenance center by means of the cellular, or cellular-like, network. The remote-reporting section will attempt to transmit the test-results data a nunber of times, before ceasing. If the auto-diagnostic unit is initiated locally at the site, the test-results may still be transmitted to the remote, telemaintenance center by means of the cellular, or cellular-like, network.

BRIEF DESCRIPTION OF THE DRAWINGS

The invention will be more readily understood with reference to the accompanying drawing, wherein:

FIG. 6 is a flow chart showing the steps involved for the subroutine of the self-testing of ring-answer process according to the invention;

FIGS. 8A and 8B show the error-code generation according to the invention;

DETAILED DESCRIPTION OF THE INVENTION

Figure 1A:
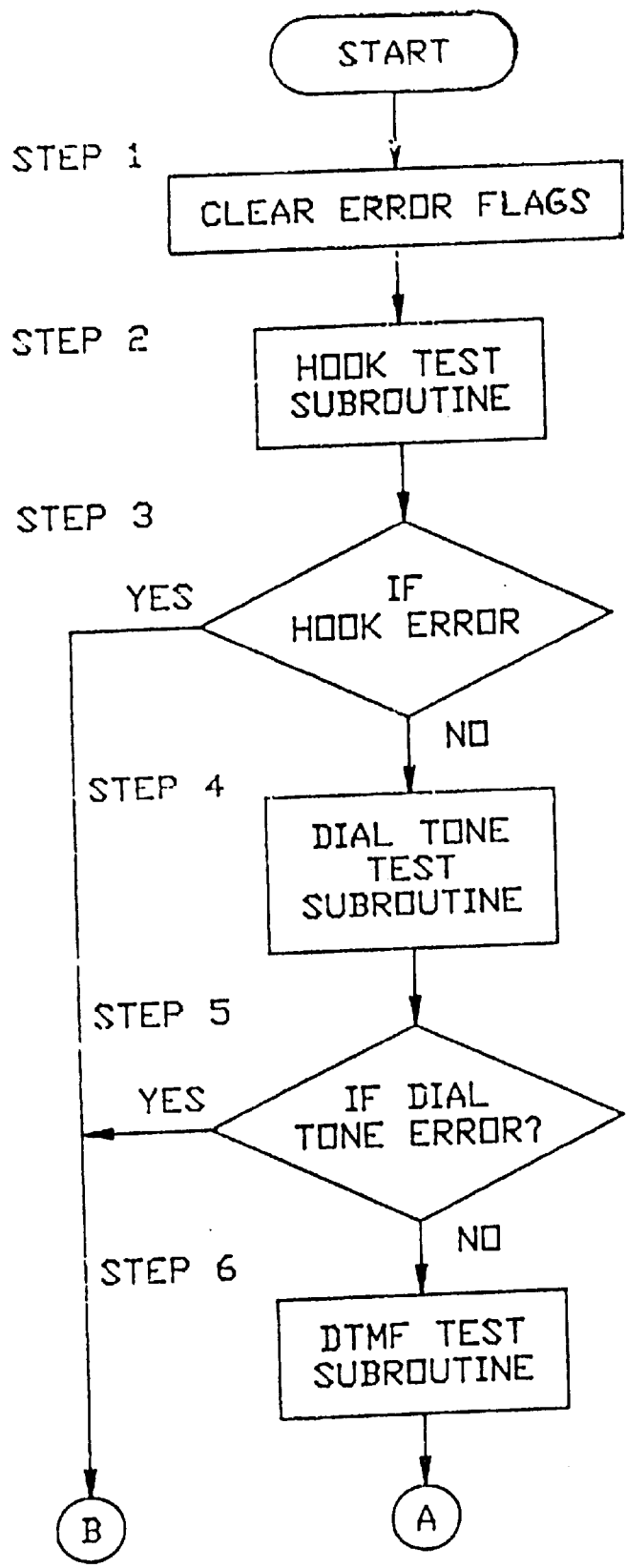
FIGS. 1A and 1B show a general flow chart for the steps involved for the self-testing according to the invention.

The auto-diagnostic maintenance system of the present invention is for use in cellular, or cellular-like, interface boards and systems, such as those disclosed in U.S. Pat. Nos. 4,658,096 and 4,737,975. In addition, the auto-diagnostic maintenance system of the present invention may be used with other radio-transceiver systems, such as IMTS, where there is provided a wireless link between a base station and master stations, and which transceiver is associated with an adapter interface board, such as that disclosed in U.S. Pat. Nos. 4,658,096 and 4,737,975, for example, which allows for connection and normal functioning of a communications-type instrument, such as a land-line telephone, facsimile machine, modem, and the like, to the radio transceiver. The interface unit provides a number of functions depending upon its intended use. For example, in dedicated alarm systems, where only outgoing calls are made by the radio transceiver, the interface unit need not provide ring generation, busy signal generation, and the like, to the communications device. Alternatively, in those systems where only incoming calls are required, the interface unit need not convert dialed DTMF or pulse signals into digital format. According to the invention, software is provided which communicates with the microprocessor of the cellular interface board or other radio-transceiver interface board, disclosed in U.S. Pat. Nos. 4,658,096 and 4,737,975, which software may be activated either manually or automatically for activating an auto-diagnostic interface board of the invention, which software diagnoses the proper functioning of all the software and hardware systems contained within the entire system of these above-mentioned patents. Every single item can be checked. For example, on the interface board, the DTMF converter will be checked, the four-line interface to two-wire connection will be checked, the busy-tone software will be checked, as well as all other functioning aspects of the interface. In addition, the transceiver will be checked, the battery will be checked, as well as any other aspects of the interface. The maintenance system of the invention is capable of making a call over the cellular, or cellular-like, network to a predetermined telephone number of a central station, or base station, which central station will then send back either a tone-back or will dial the current number of the interface system to get a busy signal. This will be considered a test. The invention will also send another telephone number over the cellular, or cellular-like, system to call the same or a different central station, so that it may send back a 1000 hertz precision tone, whereby the software of the present invention will compare that 1000 hertz tone to its own predetermined configuration in order to determine whether there is a line-connection and that the cellular, or cellular-like, system is operating correctly. This is a particularly useful system, since it allows the end-user to activate the phone in the event the user believes there is a problem with a phone. This test will then tell the telephone company whether or not the error is at the cellular system's central office or it is a problem with the base unit of the end-user.

According to the invention, there are two different modules. The first one is the telemaintenance circuit and the second is the teletariff circuit. The telemaintenance circuit generates a multiple test, as set forth below in detail, that includes a generation of a telephone call to a predetermined number. The circuit will report the results of the test to this particular number. In addition, the circuit can dial out to its own number in order to assure that the reception and transmission of the unit is working by receiving a busy signal. These sets of tests can be initiated by the subscriber by pressing a push button that is located on the side of the unit. When the button is pressed, the LED located near the button will continue flashing identifying the test is in progress. If at the end of the test the LED continues to stay on, that indicates there is a problem with the unit. This test generally takes no more than 40 seconds maximum. On the other hand, if the LED stops blinking and turns off, it indicates that the test was successful, and that the unit is in proper working order for the items that were checked on the test. As an option, the software and hardware provide that the test can be conducted from an outside number, provided that the transmission media allows it, (i.e., that the transceiver is in working order to receive a phone number).

The second circuit consists of the following: It utilizes the tariffing signal from the cellular, or cellular-like, system and generates the corresponding tariffing pulses for a standard table phone or pay phone. The device interprets the signal coming in from the cellular, or cellular-like, system, and does not need any local tariff. It operates in a similar manner for generating the long tones. It can be used with any cellular, or cellular-like, system that is capable of sending the tariff signals.

Telemaintenance Modules Flow Chart Description

The user may invoke the operational test sequence by pressing the autodiagnostic push button. When invoked, the interface board control is transferred to the autodiagnostic main subroutine of the telemaintenance module for performing the auto-testing.

Figure 1B:
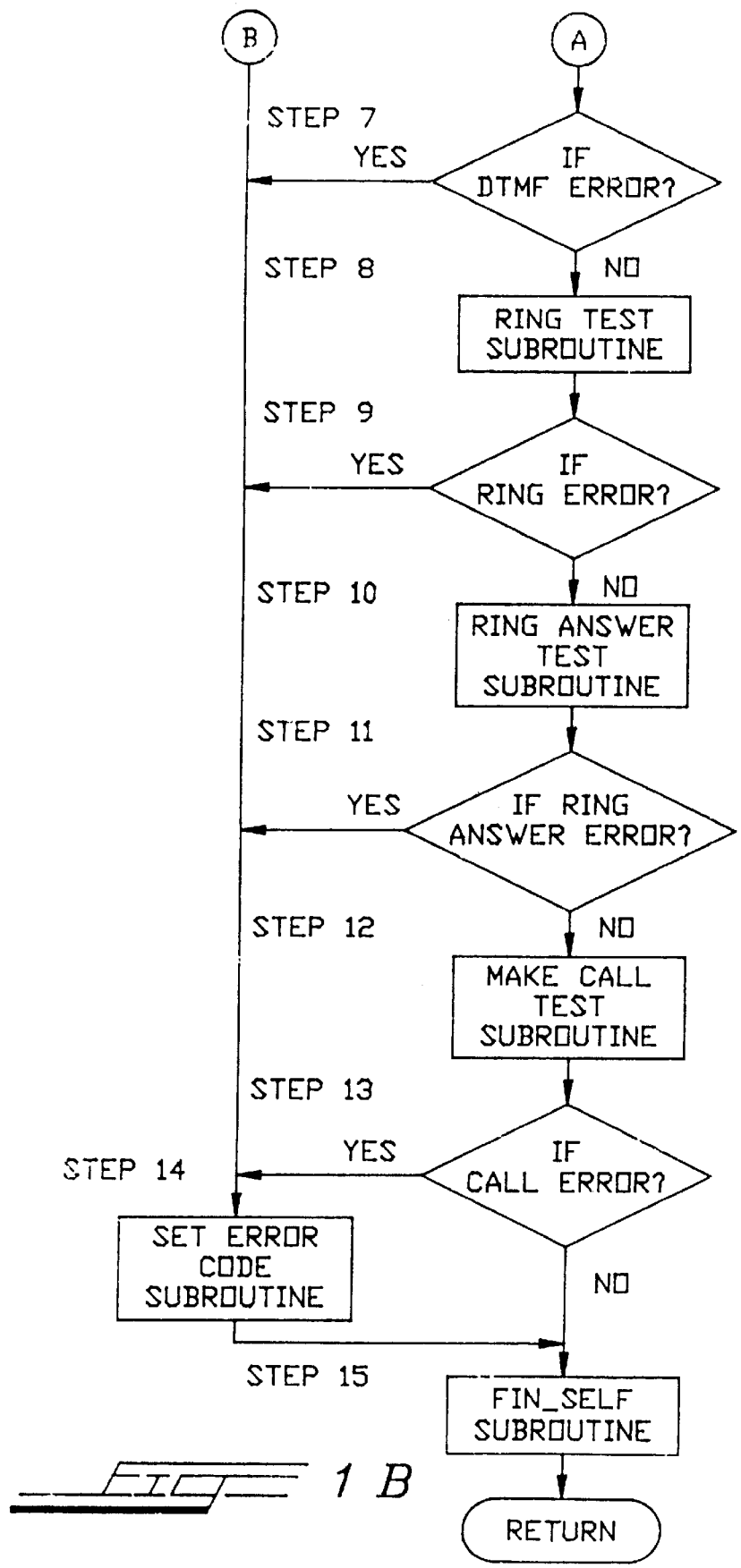

FIGS. 1A and 1B show the DO_TEST subroutine, or the autodiagnostic main subroutine. A number of calls to various test procedures are performed. After each procedure, the error flags are checked. In the event of any failure, the test sequence is stopped. Then, the status is coded, and the result is shown to the user through four LEDs, as described below.

Referring to FIG. 1A, In STEP 1, the operational test sequence starts with the initialization of variables and flags. In STEP 2, the program calls up the Hook_Test subroutine. In Hook_Test, the user's telephone is disconnected from the TIP & RING lines, while the Telemaintenance Module (described below in detail) is connected in its place, to the interface board, such as that disclosed in U.S. Pat. Nos.

4,658,096 and 4,737,975, in preparation for the test. STEP 3 checks for any error detected in Hook_Test. If any error was found, the test sequence stops, and the program proceeds to STEP 14 in FIG. 1B. However, if no error was detected, the program calls up the Dial_Tone Test subroutine in STEP 4. STEP 5 checks for any dial tone error. If any error was found, the test sequence stops, and the program proceeds to STEP 14 in FIG. 1B. However, if no error was detected, the program calls up the next test, the DTMF_Test subroutine in STEP 6. The program continues in FIG. 1B STEP 7, where any DTMF_Tone subroutine is checked. If any error was found, the test sequence stops and the program proceeds to STEP 14. However, if no error was detected, the program calls up the next test, the Ring_Test subroutine in STEP 8. STEP 9 checks for any ring error. If any error was found, the test sequence stops and the program proceeds to STEP 14. However, if no error was detected, the program calls up the next test, the Ring_Answer_Test subroutine in STEP 10. STEP 11 checks for any ring-answer error. If any error was found, the test sequence stops, and the program proceeds to STEP 14. However, if no error was detected, the program calls up the next test, the Make_Call_Test subroutine in STEP 12. STEP 13 checks for any calling-out error. If any error was found, the test sequence stops, and the program proceeds to STEP 14. However, if no error was detected, the program calls up the next test, the Fin_Self_Test subroutine in STEP 15. If any error was found during the execution of any subroutine, the program jumps to STEP 14. In STEP 14, the program calls up the Error_Acc subroutine. Finally, the test sequence ends after STEP 15 has cleared all variables and flags, returning the control back to the telephone set, and resuming normal operations of the Interface.

The following explanations of FIG. 2 to FIG. 9 correspond, and describe in detail, the individual test-subroutines above-mentioned.

Figure 2:
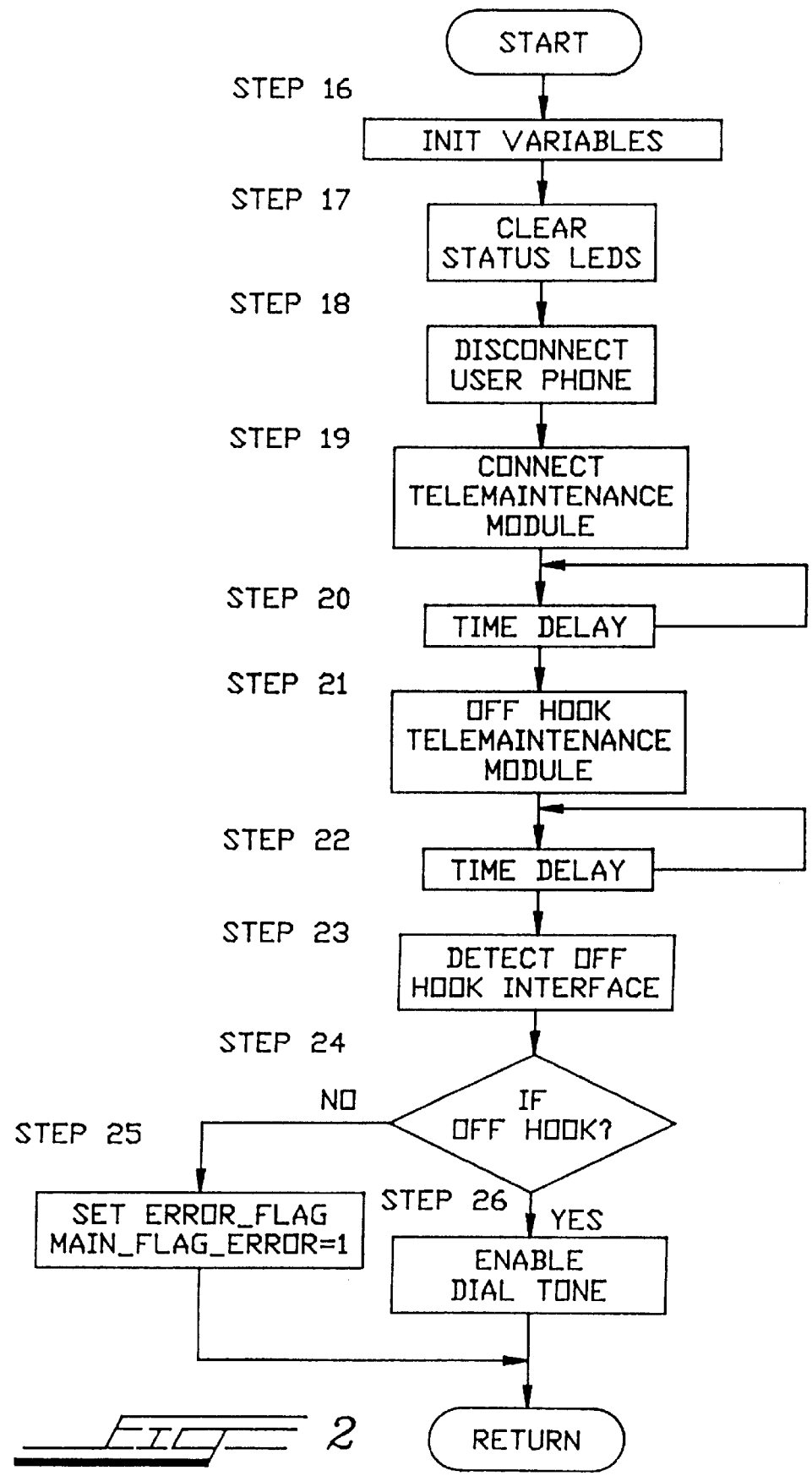
FIG. 2 is a flow chart showing the steps involved for the subroutine of the self-testing of off-hook according to the invention.

Referring to FIG. 2, the Hook_Test subroutine (Step 2 of FIG. 1A) starts with the initialization of variables and flags in STEP 16. In STEP 17, the program clears any output of the LEDs. In STEP 18, the user's telephone is disconnected from the TIP & RING lines of the interface board, while in STEP 19, the telemaintenance module of the invention is connected in place of the telephone. STEP 20 is a time delay to allow enough reaction time for such connection. In STEP 21, the telemaintenance module of the invention simulates and generates an off-hook. STEP 22 is a time delay to allow enough time for the off-hook. In STEP 23, the program checks the hook status of the interface board, which has now been coupled to the telemaintenance module. STEP 24 test for off-hook. If off-hook is not detected, the program continues to STEP 25, where the ERROR_FLAG is set and the MAIN_FLAG_ERROR is set to 1. However, if no error was detected, the program continues to STEP 26, where the dial tone is enabled for the next test shown in FIG. 3. Finally, this subroutine ends, and the program returns to the main subroutine Do_Test of FIGS. 1A and 1B.

Figure 3:
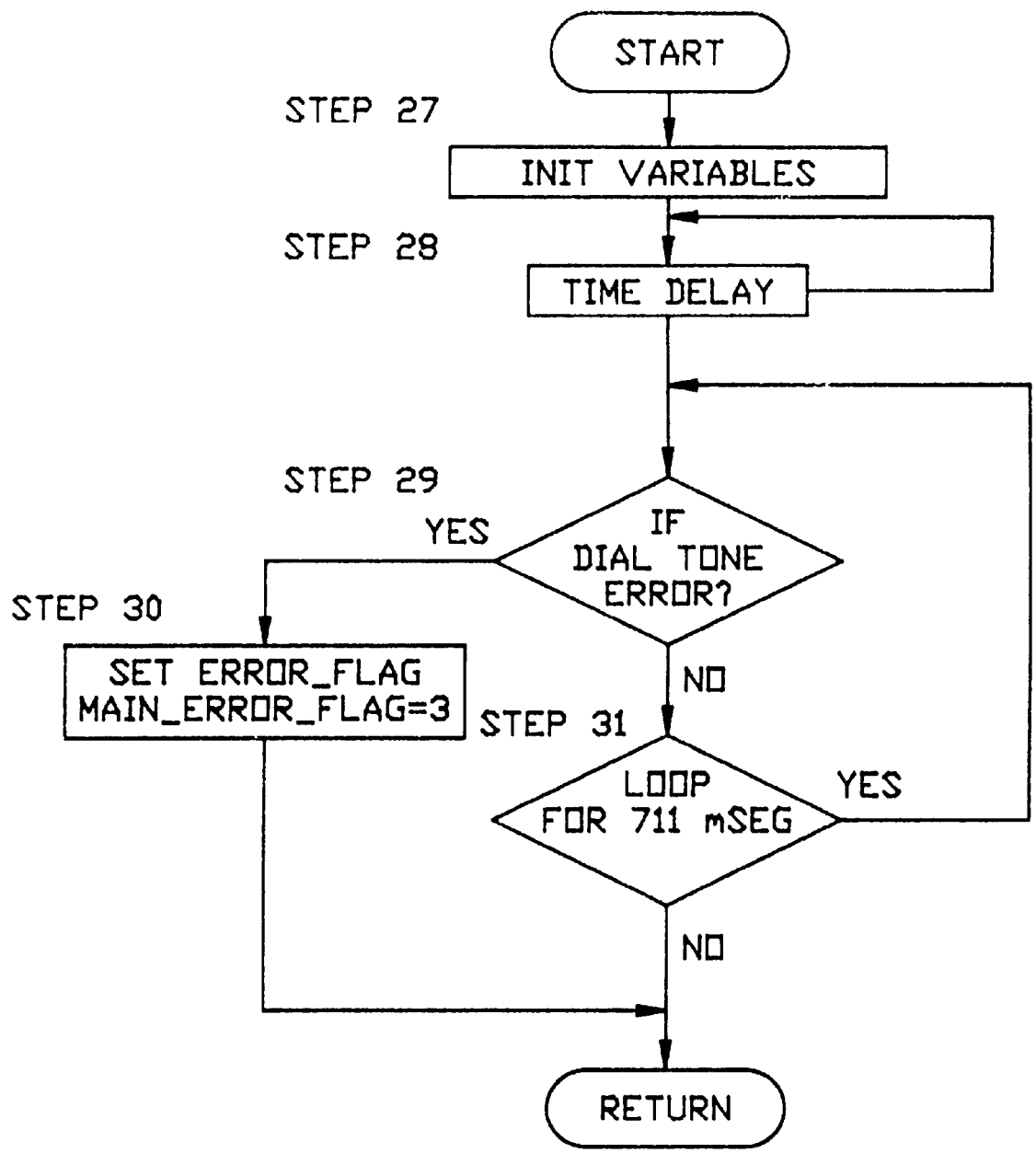
FIG. 3 is a flow chart showing the steps involved for the subroutine of the self-testing of dial tone generation according to the invention.

Referring to FIG. 3, the Dial_Test subroutine starts with the initialization of variables and flags in STEP 27. STEP 28 is a time delay to allow enough time for a proper dial tone. STEP 29 tests the dial tone. If the dial tone fails, the program continues to STEP 30, where the ERROR_FLAG is set and the MAIN_FLAG_ERROR is set to 3. However, if no error was detected, the program continues to STEP 31, where the program loops back to STEP 29, testing the dial tone for at least 711 milliseconds. After no errors have been detected after the 711 milliseconds has expired, this subroutine ends, and the program returns to the main subroutine Do_Test of FIGS. 1A and 1B.

Figure 4:
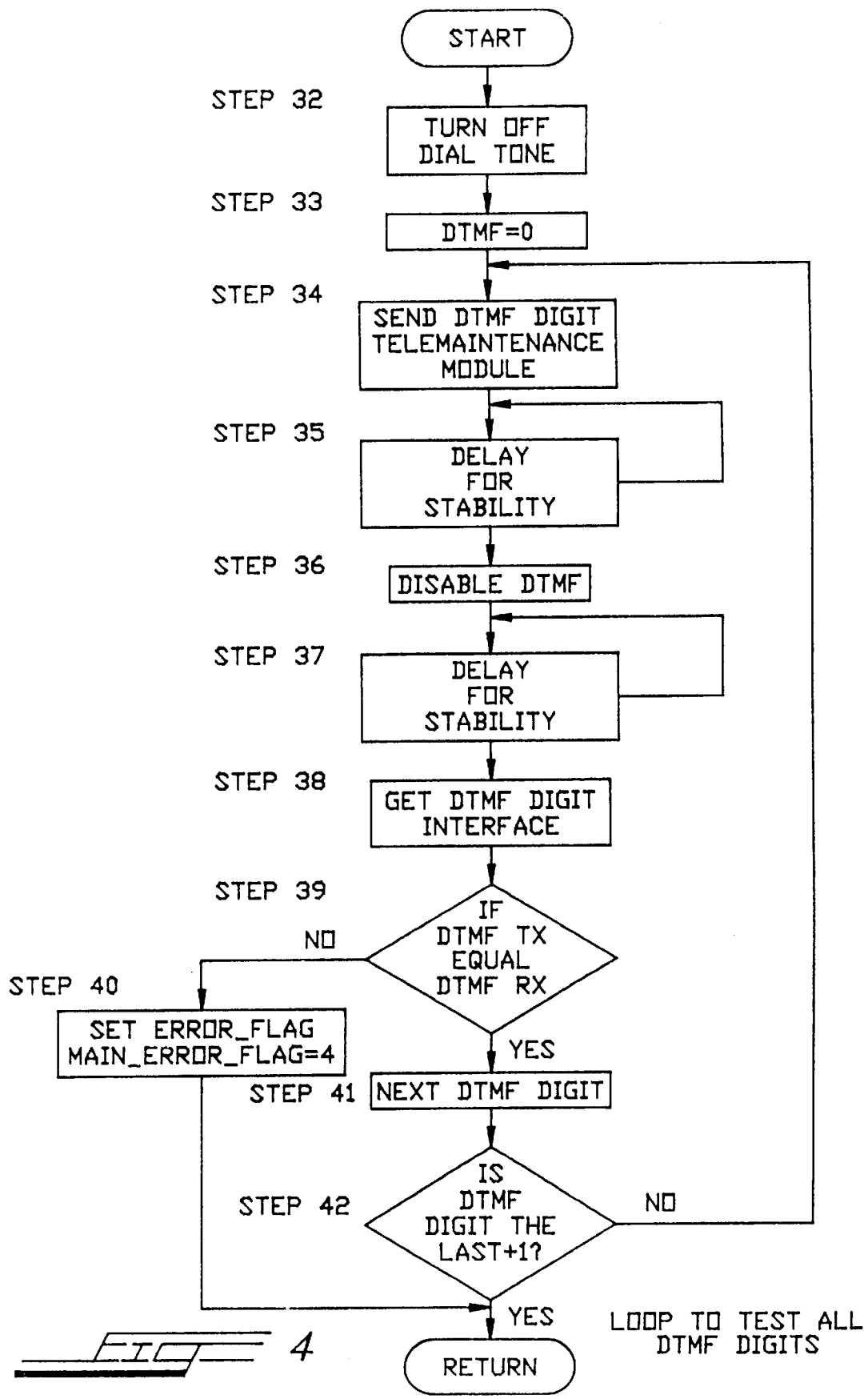
FIG. 4 is a flow chart showing the steps involved for the subroutine of the self-testing of DTMF tone generation according to the invention.

Referring the FIG. 4, the DTMF_Test subroutine, which tests for the proper DTMF conversion into digital data by the interface board, starts in STEP 32 by disabling the dial tone from the previous subroutine test. STEP 33 sets the first DTMF tone to 0. In STEP 34, the telemaintenance module sends the DTMF tone corresponding to this value. STEP 35 is a time delay to allow enough time for the tone to be on. STEP 36 disables the DTMF tone. STEP 37 is a time delay to allow the interface to detect the DTMF tone pulse. In STEP 38, the interface reads the tone. STEP 39 checks the received DTMF tone. If the DTMF tone sent is not equal to DTMF tone received, or no DTMF tone is received, then the program continues to STEP 40, where the ERROR_FLAG is set, and the MAIN_FLAG_ERROR is set to 4. However, if the DTMF tones are equal, the program continues to STEP 41, and the next DTMF digit is selected. In STEP 42, the program verifies that all DTMF tones have been tested; otherwise the program loops back to test the next digit. Finally, after all the DTMF tones have been tested, the subroutine ends, and the program returns to the main subroutine called Do_Test of FIGS. 1A AND 1B.

Figure 5A:
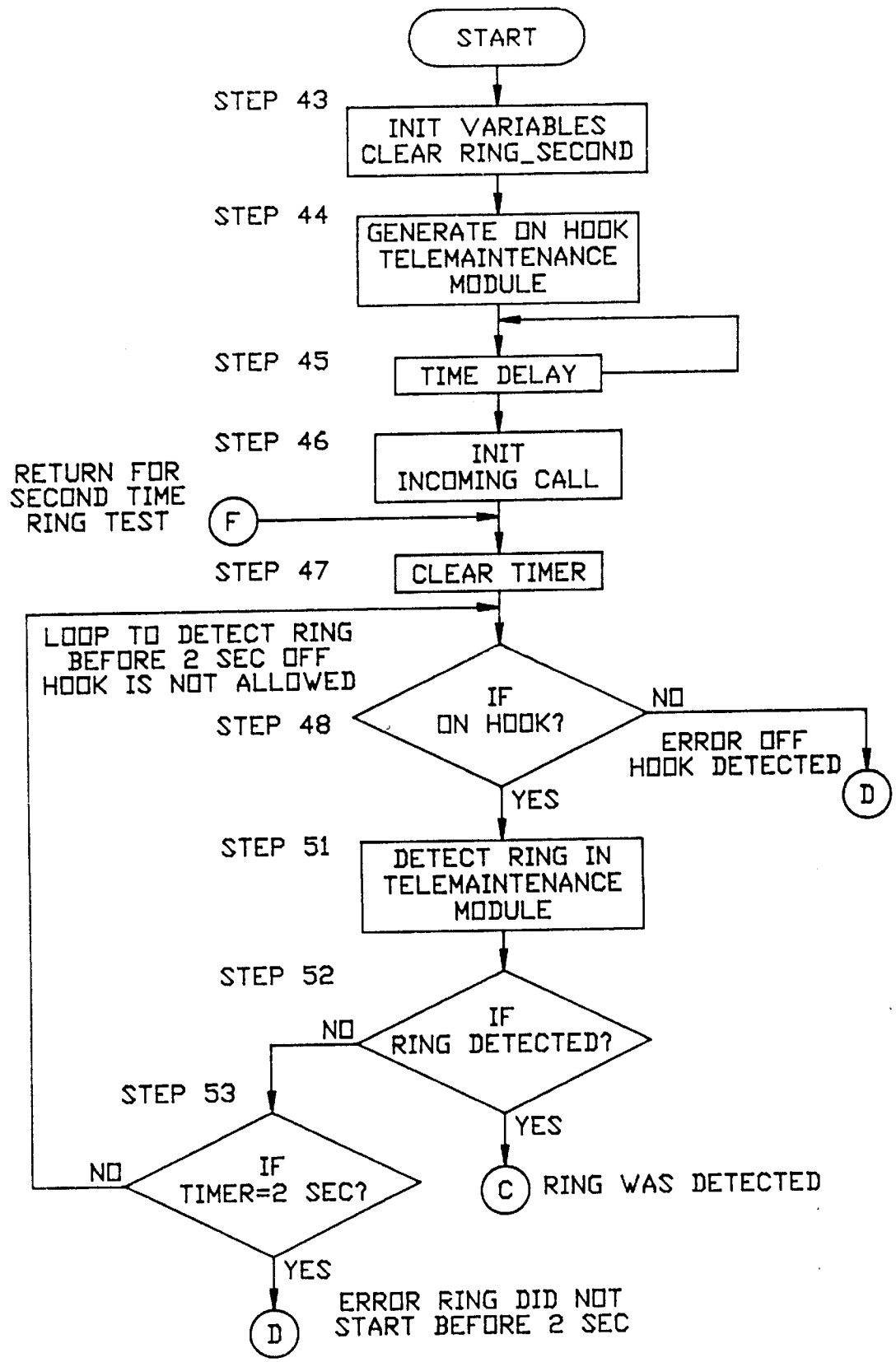
FIGS. 5A through 5C show a flow chart for the steps involved for the subroutine of the self-testing of ring generation according to the invention.
Figure 5B:
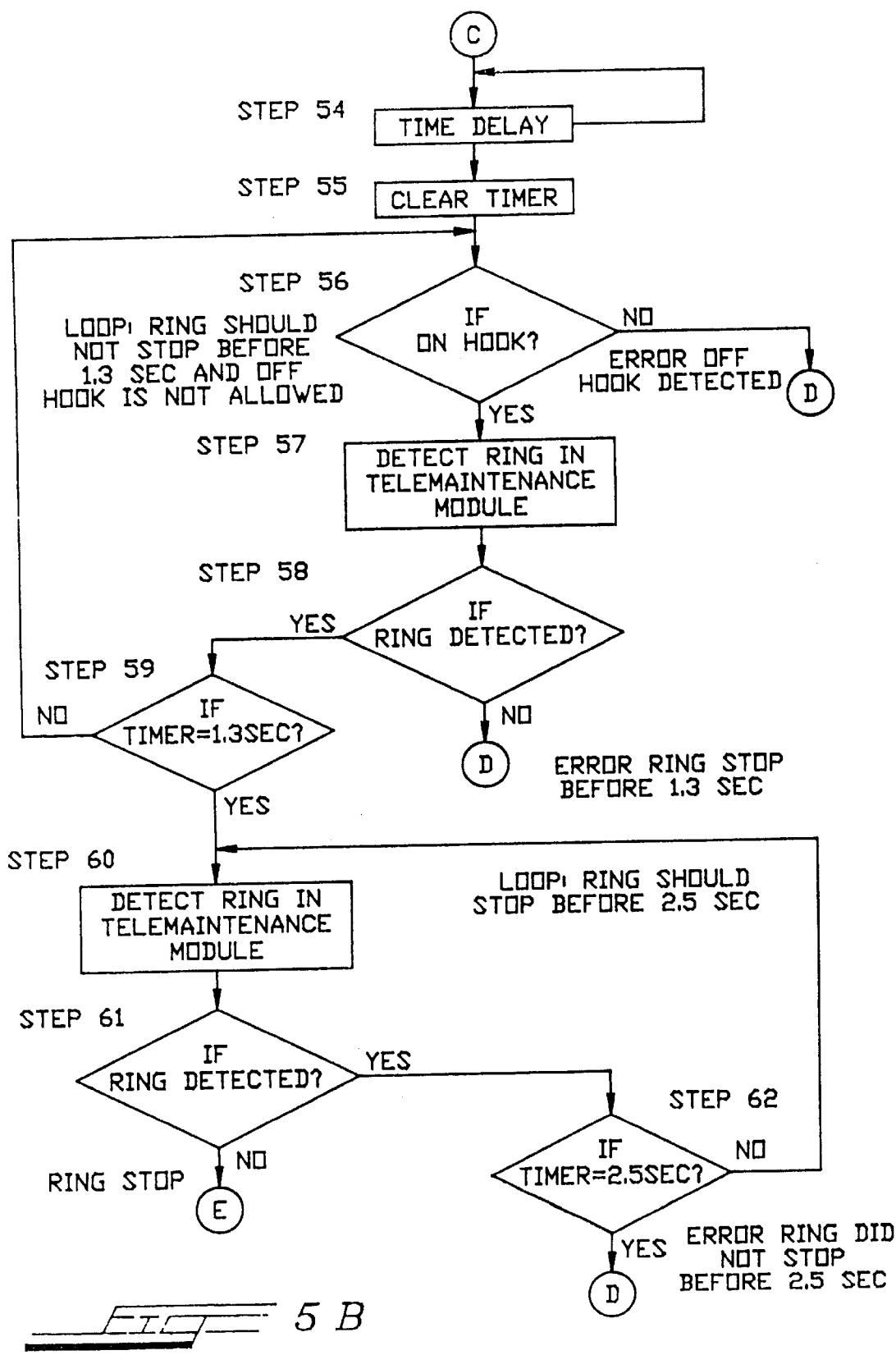

Referring to FIGS. 5A & 5B, the Ring_Test subroutine is shown. This subroutine tests the timing of the two pulses of the ring generated by the ring circuitry of the interface board. Referring to FIG. 5A, the subroutine starts with the initialization of variables and flags in STEP 43. In STEP 44, the telemaintenance module generates an on-hook. Step 45 is a time delay to allow the interface to detect the on-hook. In STEP 46, the interface is set to believe that an incoming call is in progress; therefore, the interface board will generate its ring sequence. The objective of STEPS 47 to 53 is to verify that the ring starts within the next two seconds, and that off-hook is not detected. In STEP 47, the timer is cleared. STEP 48 tests for off-hook. If off-hook is detected, then the test is stopped, and the program jumps to STEP 49 in FIG. 5C for error-indication. However, when on-hook is detected, the program continues to STEP 51, where the telemaintenance module checks for the ring to be active. STEP 52 tests if the ring has started. If the ring has started, the program continues to STEP 54 in FIG. 5B. However, if the ring had not yet started, the program checks the timer in STEP 53. If the time is less than two seconds, the program keeps looping back to STEP 48 until the ring starts. However, if the two second timer had expired, the test stops and the program jumps to STEP 49 in FIG. 5C for indicating error. Referring to FIG. 5B, STEP 54 is a time delay. The objective of STEP 55 to STEP 59 is to verify that the ring will last for at least one 1.3 seconds, and that off-hook is not detected. In STEP 55, the timer is cleared. STEP 56 tests for on-hook. If off-hook is detected, the test stops, and the program jumps to STEP 49 in FIG. 5C for indicating error. However, when on-hook is detected, the program goes to STEP 57, where the telemaintenance module checks for the Ring to be active. STEP 58 tests if the ring has stopped. If the ring has stopped, the program continues to STEP 49 in FIG. 5B. However, if the ring has not yet stopped, the program checks the timer in STEP 59. If the timer is less than 1.3 seconds, the program keeps looping back to STEP 56 until the ring stops. However, if the time has expired, the test stops, and the program jumps to STEP 49 in FIG. 5C. The objective of STEP 60 to STEP 62 is to verify that the ring will not last more than 2.5 seconds. In STEP 60, the telemaintenance module checks if the ring is active. STEP 61 tests if the ring has stopped. If stopped, the program jumps to STEP 63 in FIG. 5C. However, if the ring has not yet stopped, the program checks the timer in STEP 62. If the timer is less than 2.5 seconds then, the program keeps looping back to STEP 60 until the ring stops. However, if the time has expired, the test stops and the program jumps to STEP 49 in FIG. 5C.

Figure 5C:
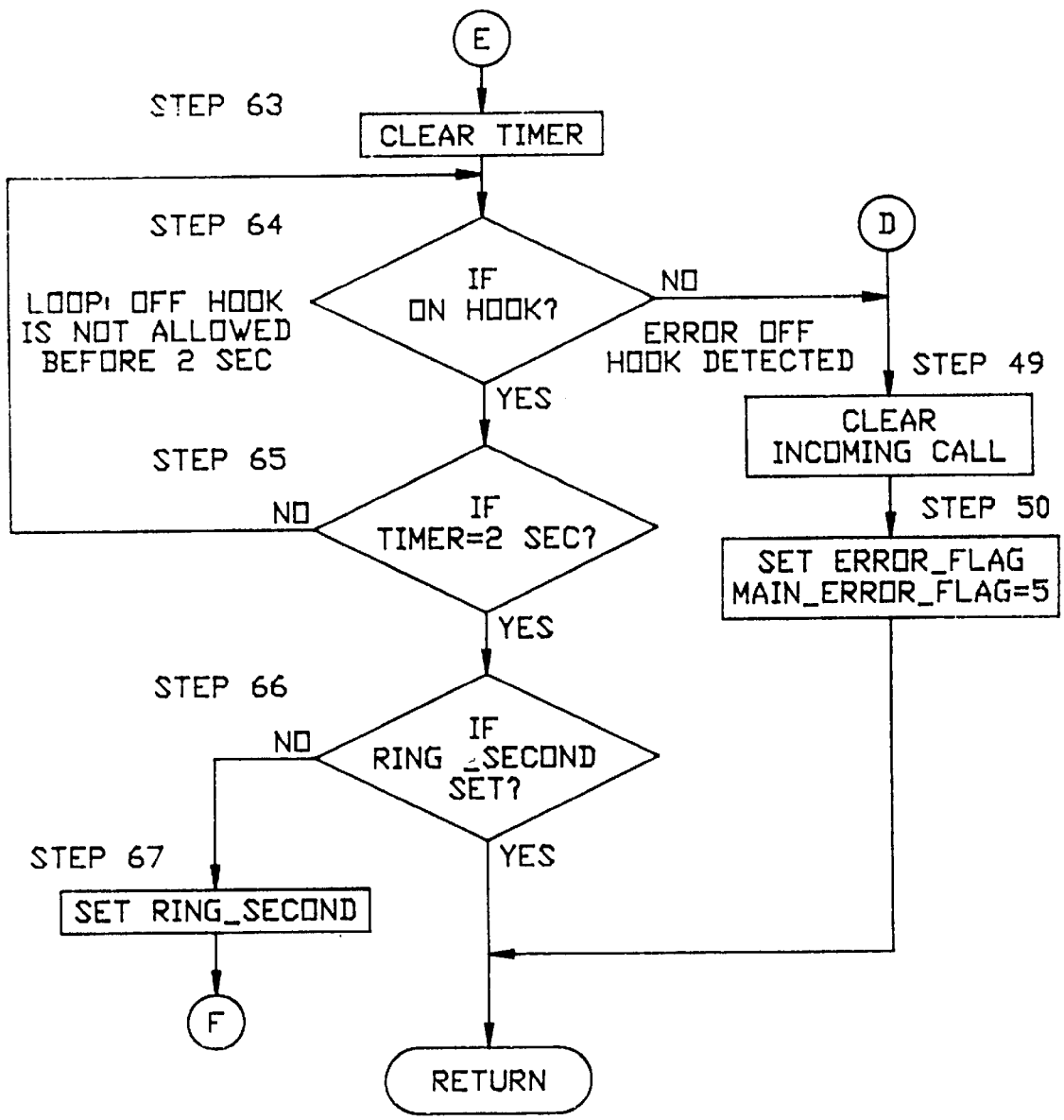

Referring to FIG. 5C, the objective of STEP 63 to STEP 65 is to verify that no off-hook is detected for a period of two seconds. In STEP 63, the timer is cleared. STEP 64 tests for on-hook. If off-hook is detected, then the test stops and the program continues in STEP 49 for indicating error. However, if off-hook is not detected, the program checks the timer in STEP 65. If the timer is less than two seconds, the program keeps looping back to STEP 64 until the ring starts. However, if the time has expired, then the program continues in STEP 66, where the program checks how many cycles this subroutine has tested the ring. If the ring has been tested for only one cycle, the program continues in STEP 67, where the flag called Ring__Second is set. Thereafter, the program loops back up to STEP 47 in order to test the ring for a second time. However, if the ring has been tested twice, the subroutine ends and the program returns to the main subroutine called Do__Test. If an error was detected during any part of the Ring__Test subroutine, the program jumps to STEP 49. STEP 49 clears the incoming call status; therefore, the ring sequence stops. Then, the program continues in STEP 50, where the ERROR__FLAG is set and the MAIN__FLAG_ERROR is set to 5. Then, the subroutine ends, and the program returns to the main subroutine called Do__Test.

Referring to FIG. 6, the Ring__Answer__Test subroutine is shown. This subroutine tests the response of the interface board when an off-hook is presented to the interface board during the ring-cycle, when answering the telephone for an incoming call. The objective of STEP 68 to STEP 69 is to verify that the ring will start within the next two seconds and that off-hook is not detected. In STEP 68, the timer is cleared. STEP 69 tests for on-hook. If off-hook is detected, then the test stops and the program jumps to STEP 73. However, if on-hook is detected, the program continues with the ring active. STEP 71 tests if the ring has started. If the ring has started, the program continues to STEP 74. However, if the ring has not yet started, the program checks the timer in STEP 72. If the timer is less than two seconds, then the program loops back to STEP 69 waiting for the ring to start. However, if the two-second timer has expired, the test stops and the program jumps to STEP 73. In STEP 74, the telemaintenance module generates an off-hook. STEP 75 is a time delay that allows the interface board to detect the off-hook. In STEP 76, the interface checks the hook-status. If off-hook is not detected in STEP 77, then the test stops and the program jumps to STEP 73. However, if the interface board detects the off-hook, the program continues in STEP 78. If an error was detected during any part of the Ring__Answer__Test subroutine, then the program jumps to STEP 73, where the ERROR__FLAG is set and the MAIN__FLAG_ERROR is set to 6. Then, the program continues in STEP 78. In STEP 78, the incoming call status is cleared; therefore, the interface board will stop the ring sequence. Then, the subroutine ends, and the program returns to the main subroutine called Do__Test.

Figure 7A:
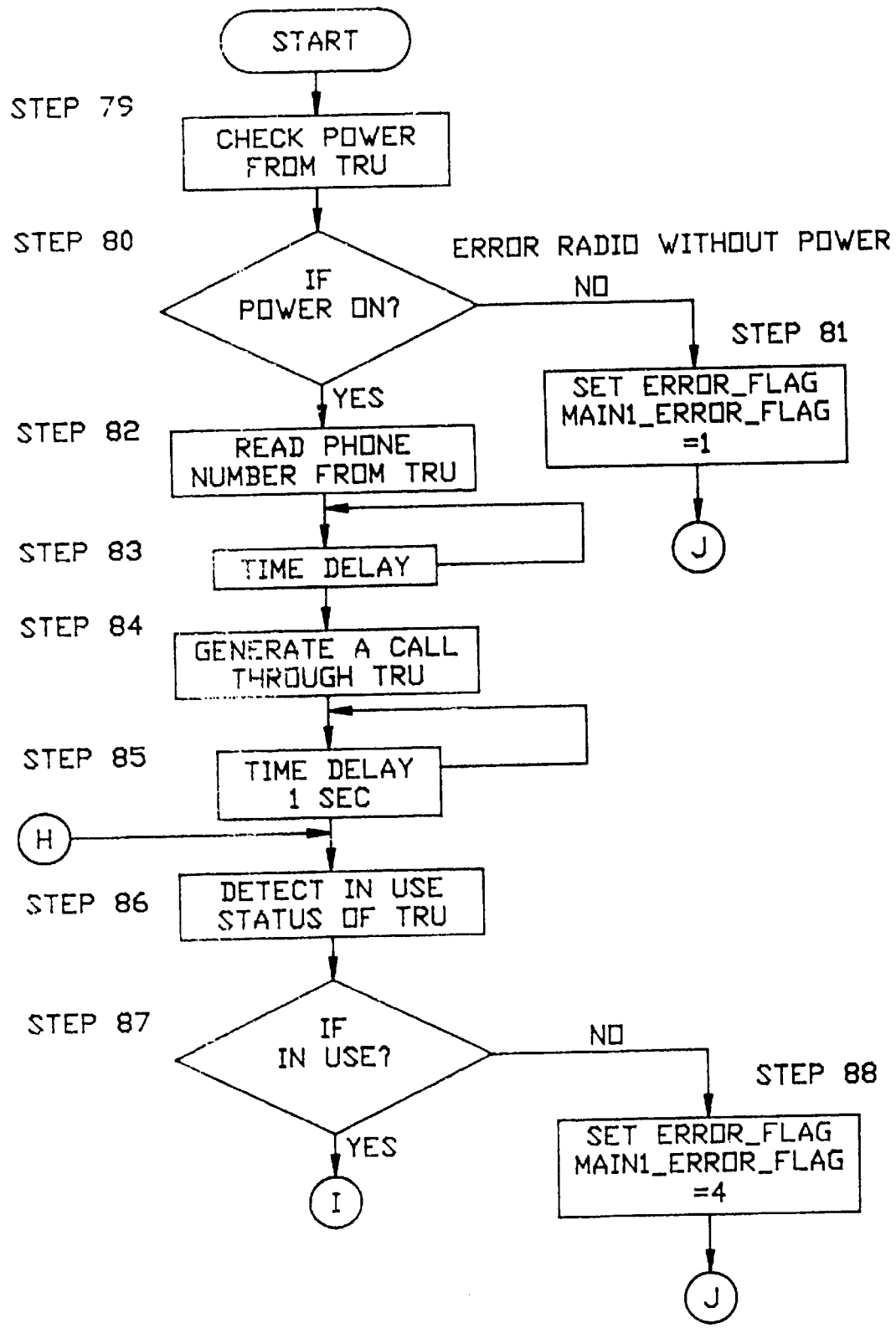
FIGS. 7A and 7B show a flow chart showing the steps involved for the subroutine of the call-test which checks for proper call-detection and answering of an incoming call according to the invention.
Figure 7B:
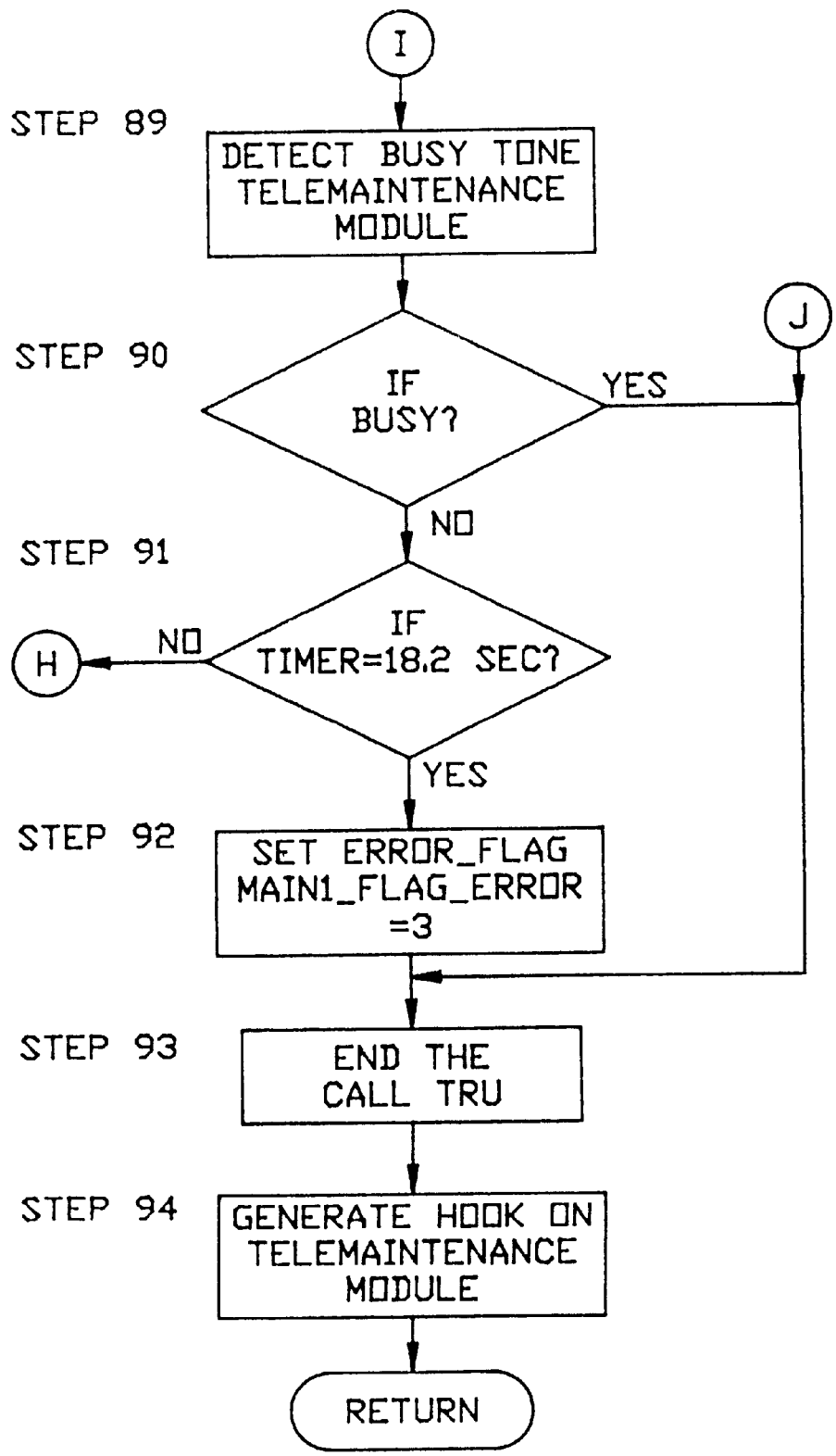

Referring to FIGS. 7A & 7B, the Call__Test subroutine is shown. This subroutine tests the cellular, or cellular-like, transceiver coupled to the interface board, by first checking the power, and, secondly, generating a call to its own telephone number. Referring to FIG. 7A, STEP 79 checks if the transceiver's power is "on". If the power is "off", the MAIN1__FLAG_ERROR is set to 1 in STEP 81, and then the program jumps to STEP 93 in FIG. 7B. However, if the power is "on", the program proceeds to STEP 82, where the interface board requests and gets the transceiver's assigned telephone number. STEP 83 is a time delay to allow reaction time for the transceiver. In STEP 84, the interface board generates a telephone call to itself. STEP 85 is a time delay to allow time for connection between the cellular, or cellular-like, network and the transceiver. In STEP 86, the interface board requests the IN USE status from the transceiver. STEP 87 checks the status of the call. If the status is not IN USE, the MAIN1__FLAG_ERROR is set to 4 in STEP 88, and then the program jumps to STEP 93 in FIG. 7B. However, if the transceiver is IN USE, the program proceeds to STEP 89 in FIG. 7B. In FIG. 7B, the telemaintenance module checks the busy-tone in STEP 89. If the busy-tone is detected in STEP 90, then the program jumps to STEP 93 for an indication that all is operating correctly. However, if the busy-tone is not detected, the program proceeds to STEP 91, where the timer is checked. If the timer is less than 18.2 seconds, then the program loops back to STEP 86. This allows more time to the cellular, or cellular-like, network to return the busy-response. However, if the time has expired, the program proceeds to STEP 92, where the MAIN1__FLAG_ERROR is set to 3. In STEP 93, the interface board sends an END of call to the transceiver. Then, the telemaintenance module presents an on-hook to the interface board in STEP 94. Finally, the subroutine ends and the program returns to the main subroutine Do__Test.

Figure 8B:
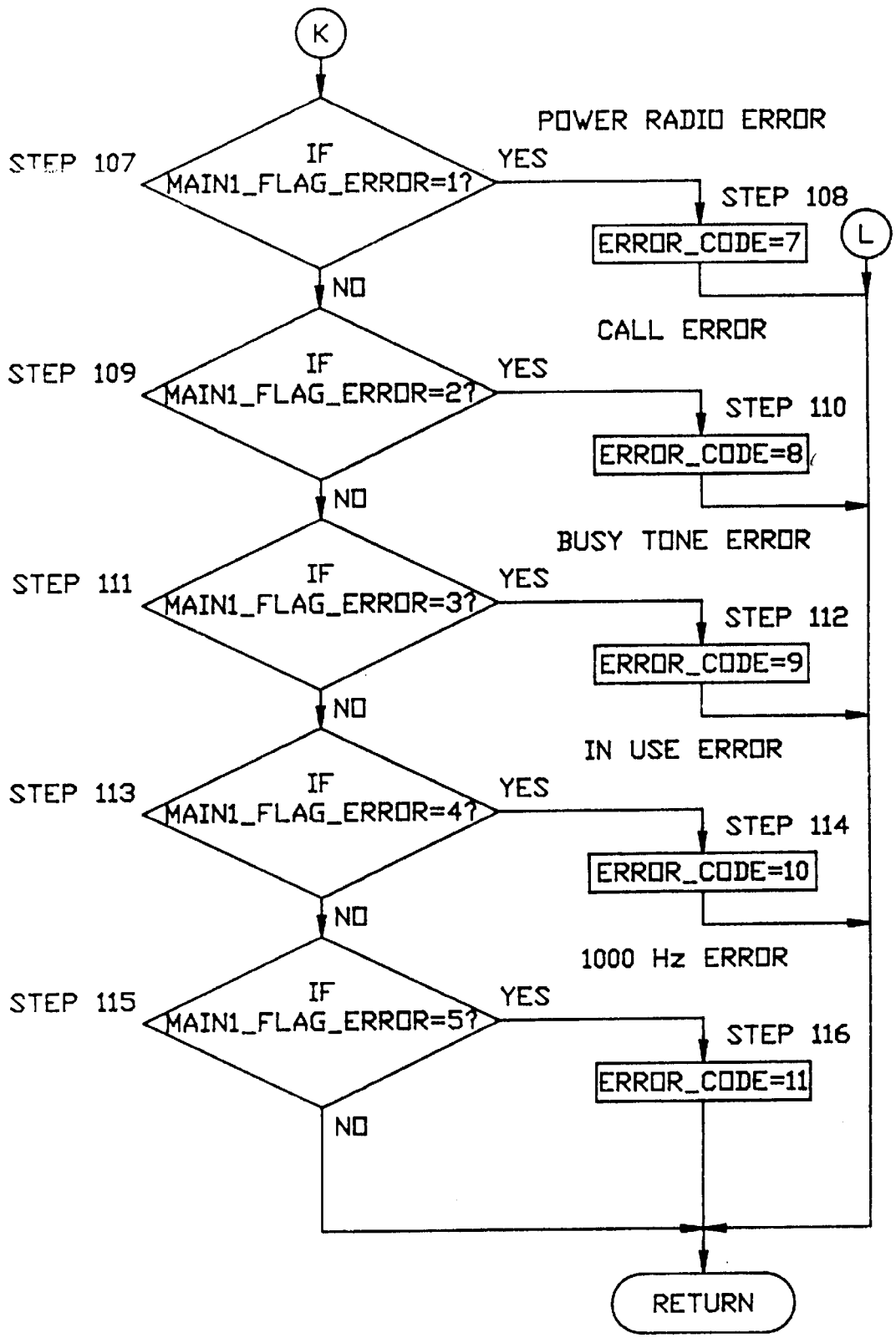

The objective of FIG. 8A and FIG. 8B is to generate a an ERROR__CODE from the previously-described error flags, in such a way that the results can be output later through LEDs. Referring to FIG. 8A, the subroutine starts checking the value of one of two error flags, the MAIN__FLAG_ERROR. STEP 95 checks if MAIN__FLAG_ERROR is equal 1 or Hook Slic Error. If true, the ERROR__CODE is set to 1 in STEP 96, and then the program returns to the main subroutine Do__Test. However, if false, the program continues in STEP 97. STEP 97 checks if MAIN__FLAG_ERROR is equal 2 or hook-ring error. If true, the ERROR__CODE is set to 2 in STEP 98, and then the program returns to the main subroutine Do__Test. However, if false, the program continues in STEP 99. STEP 99 checks if MAIN__FLAG_ERROR is equal 3 or dial-tone error. If true, the ERROR__CODE is set to 3 in STEP 100, and then the program returns to the main subroutine Do__Test. However, if false, the program continues in STEP 101. STEP 101 checks if MAIN__FLAG_ERROR is equal 4 or DTMF tone error. If true, the ERROR__CODE is set to 4 in Step 102, and then the program returns to the main subroutine Do__Test. However, if false, the program continues in STEP 103. STEP 103 checks if MAIN__FLAG_ERROR is equal 5 or ring-detection error. If true, the ERROR__CODE is set to 5 in STEP 104, and then the program returns to the main subroutine Do__Test. However, if false, the program continues in STEP 105. STEP 105 checks if MAIN__FLAG_ERROR is equal 6 or ring-answer error. If true, the ERROR__CODE is set to 6 in STEP 106, and then the program returns to the main subroutine Do__Test. However, if false, the program jumps to STEP 107 in FIG. 8B. In FIG. 8B, the subroutine starts checking the value of the second error flag, the MAIN1__FLAG_ERROR. STEP 107 checks if MAIN1__FLAG_ERROR is equal 1 or power-radio error. If true, the ERROR__CODE is set to 7 in STEP 108, and then the program returns to the main subroutine Do__Test. However, if false, the program continues in STEP 109. STEP 109 checks if MAIN1__FLAG_ERROR is equal 2 or call error. If true, the ERROR__CODE is set to 8 in STEP 110, and then the program returns to the main subroutine Do__Test. However, if false, the program continues in STEP 111. STEP 111 checks if MAIN1__FLAG_ERROR is equal 3 or busy-tone error. If true, the ERROR_CODE is set to 9 in STEP 112, and then the program returns to the main subroutine Do_Test. However, if false, the program continues in STEP 113. STEP 113 checks if MAIN1_FLAG_ERROR is equal 4 or "In Use" error. If true, the ERROR_CODE is set to 10 in Step 114, and then the program returns to the main subroutine Do-Test. However, if false, the program continues in STEP 115. STEP 115 checks if MAIN1_FLAG_ERROR is equal 5 or 1000 Hz. error. If true, the ERROR_CODE is set to 11 to STEP 116 Do_Test. However, if false, the program returns to the main subroutine Do_Test.

Figure 9:
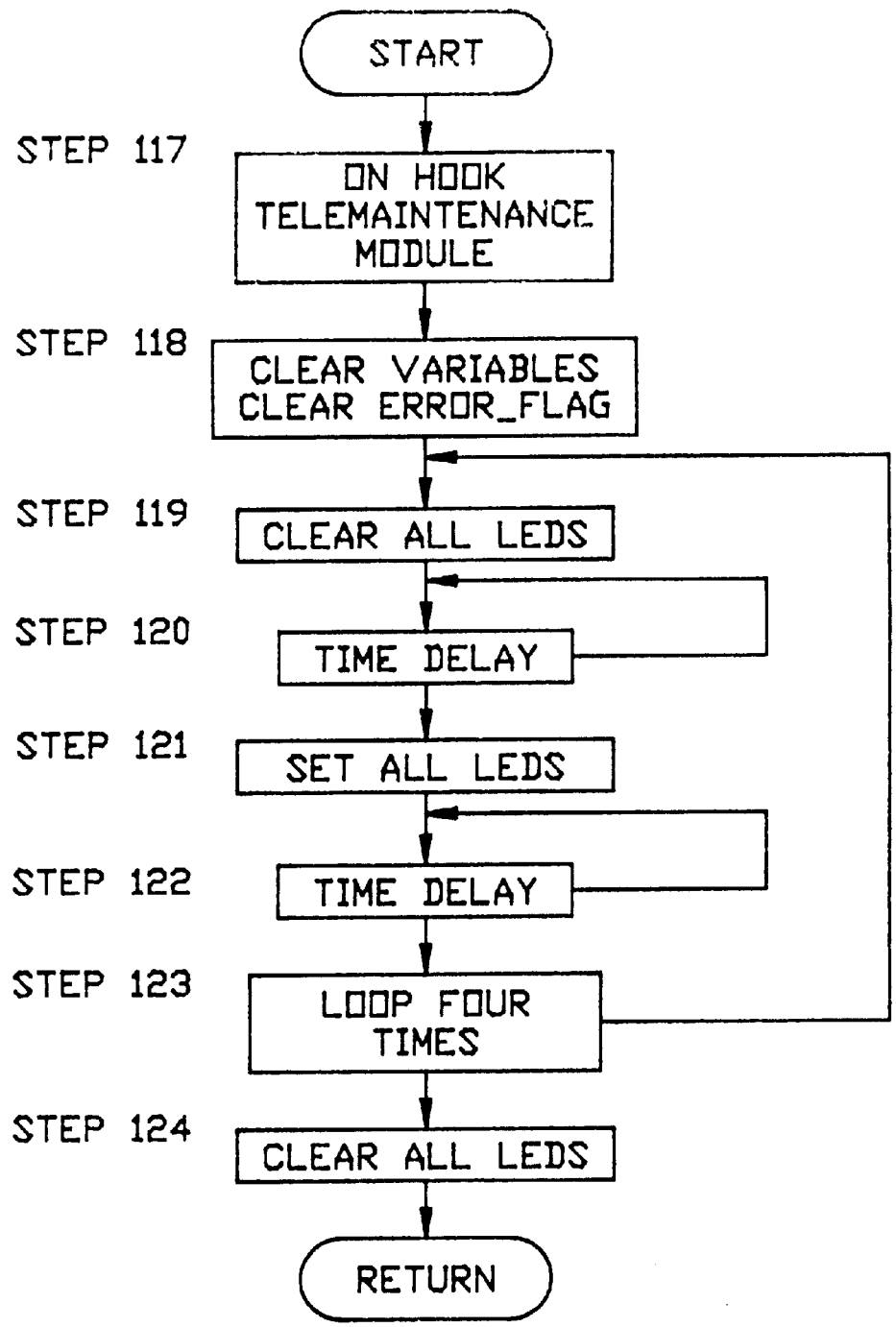
FIG. 9 is a flow chart showing the reset subroutine according to the invention.

Referring FIG. 9, FIN_SELF subroutine, the objective of this subroutine is to reset the interface board to its normal functioning, and to show the end of the test by flashing the LEDs four times. The subroutine starts with STEP 117, where the telemaintenance module generates an on-hook. In STEP 118, all variables and error flags are cleared. STEP 119 turns off all LEDs. STEP 120 is a time delay. STEP 121 turns on all LED's. STEP 122 is a time delay. STEP 123 permits to loop back to STEP 119, so that the flashing is performed four times. Finally, STEP 124 clears all LEDs, and then the program returns to the main subroutine Do_Test of FIGS. 1A & 1B.

Figure 15:
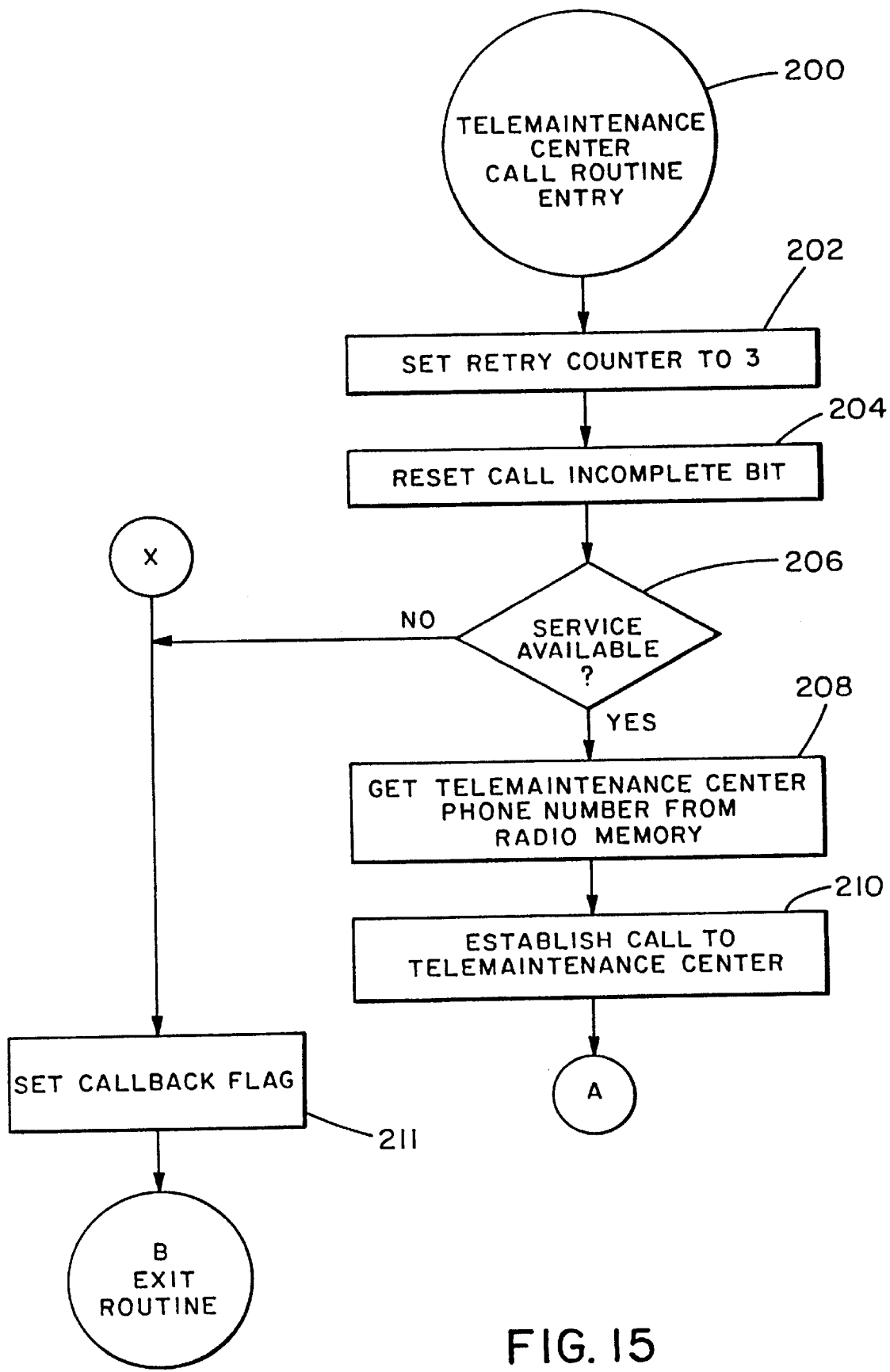
FIGS. 15–17 are flow charts showing the procedure when the test results of the cellular or cellular-like interface, with associated equuipment, are sent to a remote telemaintenance center.

The following is a description of the operation of the of the invention, with reference being had to FIG. 15, which is followed by the description of the individual circuits used for carrying out the above-described auto-test, which is followed by the software program for carrying out the operations detailed therein.

Figure 10:
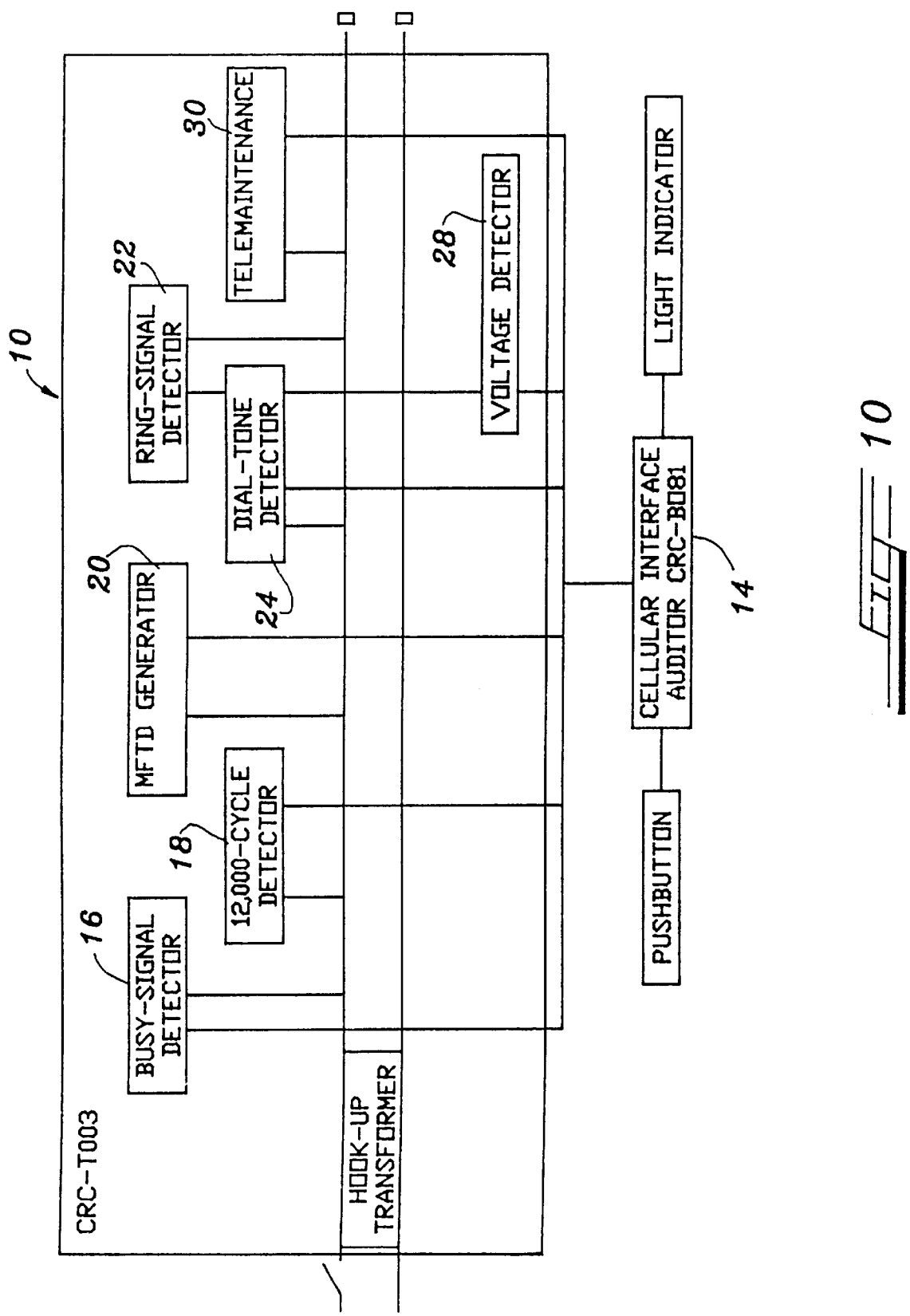
FIG. 10 is a block diagram of the system of the invention.

Referring to FIG. 10, there is shown a block diagram of the telemaintenance circuit module, which is indicated generally by reference numeral 10. The telemaintenance circuit module 10 is installed in a cellular, or cellular-like, adaptor system such as that disclosed in U.S. Pat. Nos. 4,658,096 and 4,737,975, and is designed to initiate a process of automatic testing from the facilities of the telephone subscriber by push-button activation or by automatic testing at intervals of approximately 12 hours, according to the flow charts of FIGS. 1A–9, as described above in detail. The final result of this autotest will be provided to the user by way of an orange-colored light indicator (LED) installed in the right wall of the cellular, or cellular-like, adaptor. The telemaintenance circuit module 10 has the capacity of reporting the results of the test to a remote service center. This report will be accomplished by way of an automatic call to the assigned number for the service center. This function requires that the service center be equipped with the hardware and software necessary to establish communication, and to interpret the received reports. The autodiagnostic test of the invention verifies the correct operation of the cellular, or cellular-like, adaptor, including its components, such as: principal circuits of the interface card, data cable between the radio and interface, transmission line, antenna, cellular, or cellular-like, transceiver, tollcharge circuit and supply source. The telemaintenance circuit has been configured in order to call the same number assigned to the adaptor transceiver where the test is carried out. The autodiagnostic circuit is programmed to detect a busy or line-congestion signal as an indication that a call can be made, and that the transmission circuit is operating correctly.

The telemaintenance circuit module 10 is designed to be utilized in the cellular, or cellular-like, adaptor unit in order to verify that the latter is operating correctly without necessitating sending technical personnel to the site where the equipment is installed. The telemaintenance circuit module 10 is supplied directly from the cellular, or cellular-like, interface board. The advanced telemaintenance circuit is not an autonomous circuit. Its operation depends on control signals that it receives from the auditor localized in the cellular, or cellular-like, interface board. The auditor compares the results of the tests with the parameters of the system's operating program. The autodiagnostic circuit of the telemaintenance circuit module 10 conducts the following tests: Answering errors [wrong number]—This test is conducted by two alternate methods; ring voltage—the circuit generates a call and detects the presence of ring voltage that the interface card produces; Call answer—verifies that the ring stops once it is answered; Dial tone—verifies the presence of the dial tone; MFTD Operation—assures that the interface card properly detects the receipt of the MFTD [multifrequency tone detector] tones; transceiver test; reception circuit test; transmission circuit test; tollcharge circuit test—verifies the frequency characteristic of the pulses generated at 12 KHz; transceiver power supply; performance of the power supply system. These tests have been detailed above in the description of the flow charts of FIGS. 1A to 9.

The telemaintenance circuit module 10 is connected to the conventional, cellular, or cellular-like, interface card by a 20-position plug connector. The test routine is initiated by way of a manual switch installed on the right side of the adaptor box. Upon finding an abnormality in the operation of the telephone, as, for example, not hearing the dial tone upon picking up the receiver, the subscriber proceeds to the adaptor box and presses a test pushbutton, which is properly identified. The telemaintenance circuit module 10 proceeds to disconnect the connection of the subscriber's telephone to the cellular, or cellular-like, interface board, and to accomplish a sequence of autodiagnostic tests, as described above. The telemaintenance circuit module 10 is also programmed to initiate the test routine automatically at intervals of approximately 12 hours from the moment the cellular, or cellular-like, interface board is turned on. When the test is automatically initiated, the sequence of the outgoing test call is not generated. By means of further development, the autodiagnostic test start-up function can be initiated from a remote center. This telemaintenance function carries a modification to the operating software of the interface board, and has an auxiliary development for the hardware and software of the telemaintenance center. Upon initiating the autotest routine, the orange-colored light indicator (LED) will flash to indicate to the subscriber that the test is taking place. There are pauses in the indicate flash of approximately one second between each of the tests accomplished by the circuit. The complete test will last approximately 40 seconds. Upon finishing the test, the success of the test is shown by the light indicator remaining on. In this case, the existing problem would be related to the wiring or to the telephone apparatus connected to the cellular, or cellular-like, interface board. Once the light indicator stays lit continuously, the cellular, or cellular-like, interface board returns to its normal operating condition. When a breakdown of the cellular, or cellular-like, interface board is determined from the tests, the light indicator will be extinguished indefinitely. This indicates to the user that a breakdown exists in the cellular, or cellular-like, adaptor. Once the test routine is finished, the cellular, or cellular-like, interface board returns to its normal operating condition irrespective of what breakdown was detected. The user may continue using the adaptor even with the existing limitations due to the detected breakdown.

The 4-light indicator (LEDs) in the circuit of the cellular, or cellular-like, interface board will be utilized to identify the detected breakdown. This presentation is of help to the service technician who can gain access to the inside of the box in order to ascertain the nature of a possible breakdown. The combination of "on" and "off" LED's will identify the primary detected breakdown in the test. This combination will remain lit for 60 seconds once the test ends. A list of the possible breakdown codes indicated by the LED's of the cellular, or cellular-like, interface board is given below.

On concluding the autotest, a call will be initiated to the telemaintenance center if a breakdown has been detected. Once the communication is established, the detected breakdown will be reported. This telemaintenance function will allow the establishment of a database for each unit. If the test was manually initiated by way of the pushbutton, the complete result of the finished test, irrespective of whether breakdowns were detected, will be reported to the telemaintenance center.

The following is a listing of the codes as displayed by the LED array:

| Type of Error | LED 5 | LED 4 | LED 3 | LED 2 |
|---|---|---|---|---|
| 4.10 ERROR CODE | | | | |
| No Breakdowns | OFF | OFF | OFF | OFF |
| Loop Error | OFF | OFF | OFF | ON |
| Loop Error | OFF | OFF | ON | OFF |
| Dial Tone | OFF | OFF | ON | ON |
| MFTD Detector | OFF | ON | OFF | OFF |
| Ring Detector | OFF | ON | ON | ON |
| Call Answer | OFF | ON | ON | OFF |
| Transceiver Feed | OFF | ON | ON | ON |
| Transmitter (Call) | ON | OFF | OFF | ON |
| Receiver (Busy) | ON | OFF | OFF | OFF |
| Tone Detection at 12 KHz | ON | OFF | ON | ON |
| Feed from Power Source | ON | OFF | ON | OFF |
| "NO SERVICE" | ON | ON | ON | ON |
| Transmission Circuit | ON | ON | ON | OFF |
| Undetermined | ON | ON | OFF | ON |
| Undetermined | ON | ON | OFF | OFF |

The sequence of the autotest is as follows. The first action accomplished by the telemaintenance circuit is disconnecting the installation of the subscriber. Then, a condition of "answer the subscriber's telephone" is simulated. In this condition, the correct detection of the loop closing can be checked, thus generating the dial tone. Then, the correct generation of the dial tone can be verified within a minimum frequency and level range. Next, a test of the multifrequency tone detector of MFTD begins. This consists of the telemaintenance circuit module's autodiagnostic card generating the entire sequence of 16 MFTD tones, sending it to the conventional, cellular, or cellular-like, interface board of the cellular, or cellular-like, adapter, and verifying that these tones are correctly detected. Then, a test is carried out for verifying the correct functioning of the ring generator. The ring-current is generated, verifying its frequency and level within an established minimum range. Then, the condition of answering the telephone is simulated anew, or call answer, in order to check the function of the ring circuit, which should deactivate before the telephone is answered. The next test detects the capacity of the tollcharge circuit to generate pulses at 12 KHz within a minimum frequency and level range, for the case of cellular, or cellular-like, -adapter pay telephones. The pulses generated by the tollcharge card will be detected by a precise pulse detector in the telemaintenance circuit module 10 in a manner that is well-known. For cellular, or cellular-like, adapter systems that do not have a tollcharge module, then the connector J1.3 of the cellular, or cellular-like, interface card is configured with the bridge removed. The bridge will be installed in those units that have the tollcharge module installed.

The next tests verify the functioning of the cellular, or cellular-like, transceiver. First, supply to the transceiver is verified. This test is made by means of the detection of +12 VDC derived from the data connector of the transceiver. Secondly, the transceiver is verified that it is in a condition of providing cellular, or cellular-like, access-service, indicated by the absence of the "NO SERVICE" signal. The presence of the "NO SERVICE" signal will be recognized as a breakdown. This condition can be caused by a cover defect, and not just a breakdown of the cellular, or cellular-like, transceiver. Next, a call is generated through the cellular, or cellular-like, network, to the number owned by the subscriber. The transceiver function is checked in this manner, detecting it as receiving a busy signal from the system, since, it is calling itself. In the case of finding the network congested, this will inform the transceiver of a "PATH ENGAGED" condition. The transceiver then generates a congestion (busy) tone. This tone is interpreted as a correct transceiver function, the same as the busy signal. This test will be accomplished only when the routine is manually initiated by pushbutton. This test will not be accomplished in units that initiate the process automatically. The voltage of the supply system power is also checked. If the voltage is less than 13.5 VDC, a breakdown in the supply source is detected.

In FIG. 10, the main telemaintenance module 10 is coupled to the standard cellular, or cellular-like, adapter or interface board 14. Within the telemaintenance module, there are a number of individual circuits that are used for performing the self-diagnosing tests, as described above. These circuits are: The busy-signal detector 16 used during the test for proper reception of a call made by the telemaintenance module during the call-back self-testing described above with reference to FIG. 7A; the 12,000-cycle detector circuit 18 used for tollcharge testing, which verifies the frequency characteristic of the pulses generated at 12 KHz; the MFTD generator circuit 20, which generates the DTMF signals converted by the cellular, or cellular-like, interface card, as described above with reference to FIG. 4; the ring-signal detector circuit 22, which is used for detecting the ring-signal generated by the cellular, or cellular-like, adapter interface board during the ring-test and ring-answer subroutines, described above with reference to FIGS. 5A through 6; the dial-tone detector circuit 24, which detects for the proper generation of dial tone by the cellular, or cellular-like, adapter interface board 14, as described above with reference to FIG. 3; the voltage-detector circuit 28 for testing the power supply of the transceiver and the entire system; and the telemaintenance control unit 30, which is the control unit and which is also used for calling and reporting to the central reporting station the results of the autotest. The actual configuration of each of the above-noted circuits is shown in FIGS. 11–14, which are described below in detail.

Figure 11:
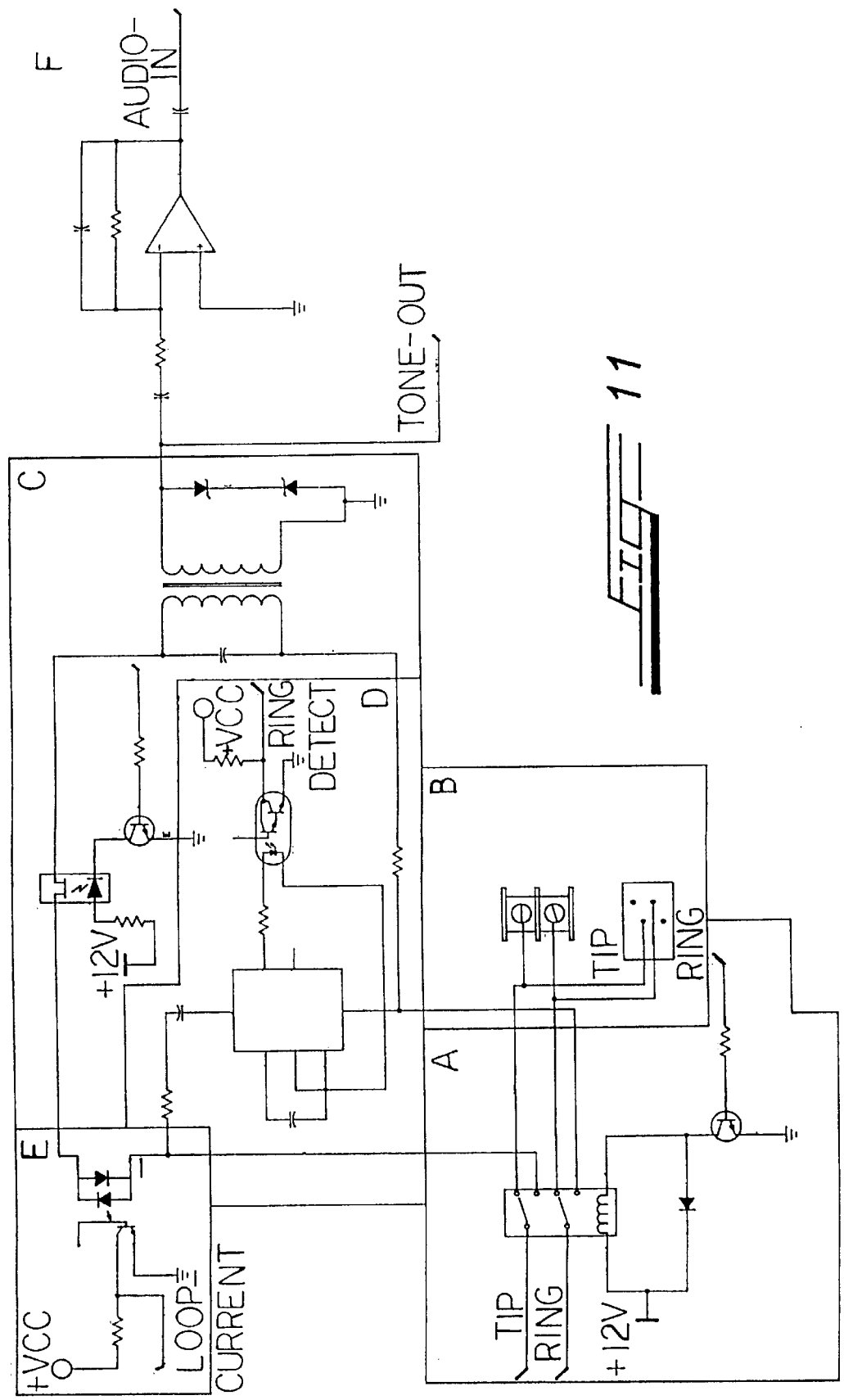
FIGS. 11–14 are schematics showing the various circuits used for testing the cellular, or cellular-like, interface and transceiver by simulating the events to be tested.

Referring now to the FIGS. 11–14, there are shown the hardware circuits for performing the simulation tests described above during the entire self-testing process. Referring to FIG. 11, there is shown the interconnection circuit of the telemaintenance circuit module 10. The part of the schematic of FIG. 11 labeled "A" shows the location where the telemaintenance circuit is hooked into the lines of TIP & RING of the conventional cellular, or cellular-like, adapter interface board. The relay labeled "RELY1" is used to disconnect the user's telephone from the cellular, or cellular-like, interface during the maintenance operation test. Instead thereof, the telemaintenance circuit is hooked up to the TIP & RING in order to perform the tests. When the "ENABLE-TEST" signal is set to HI, the transistor Q3 is forced into saturation, and then energizes RELY1, connecting the maintenance circuit to the TIP and RING. The part of the schematic of FIG. 11 labeled "B" shows the user-telephone hook-up connector, where the user's telephone can be hooked to the board in two possible ways. J1 is a two terminal connector of P1 of a normal RJ11 telephone type socket.

The section of the schematic of FIG. 11 labeled "C" is the audio interface circuit, which is used as an interface between the TIP and RING lines and the Audio. T1 is a telephone matching transformer. Its function is to maintain similar AC and DC current characteristics of a telephone while allowing audio signals to be received and transmitted. Zener diodes D1 & D2 are used to cut up any signal with voltages higher than +/−4.5V. Also included is an opto-isolator SSR1 that, in conjunction with transistor Q4, offers a mechanism to close the TIP & RING circuit. When the "Conn-Loop" signal is set to HI, the transistor Q4 is forced into saturation, which then energizes SSR1, closing the circuit and performing an off-hook.

The section of the schematic of FIG. 11 labeled "D" is the ring-detection circuit, which contains two main parts: U2, which is a ring-detector integrated circuit, and U9 with opto-isolator that provides a proper Cmos signal level output. A current is provide between pin 4 and pin 7 of U2 as an output signal when a ring-voltage is present at the TIP & RING lines. This current is then transformed by the opto-isolator U9, which then provides an active Low signal to the I/O.

The section of the schematic of FIG. 11 labeled "E" shows the loop-current detector, which contains an opto-isolator used to detected loop current. When the test is enabled (the "Enable-Test" signal is HI in part A) and an off-hook is performed, (the "Conn-Loop" signal is HI in part C), the TIP & RING lines go into close-circuit providing an off-hook current. This current is then transformed by U17 into an active Low signal to the I/O.

The section of the schematic of FIG. 11 labeled "F" is the input-output audio circuitry composed of ¼ of U1, an operational amplifier IC. The main function of this circuitry is to isolate and pre-amplify the incoming audio signals. The output of this circuit is called "Audio-In". Also, in this section the DTMF output generated by the telemaintenance circuit of the invention is sent to the TIP & RING lines. This DTMF signal is labeled as "Tone-Out".

Figure 12:
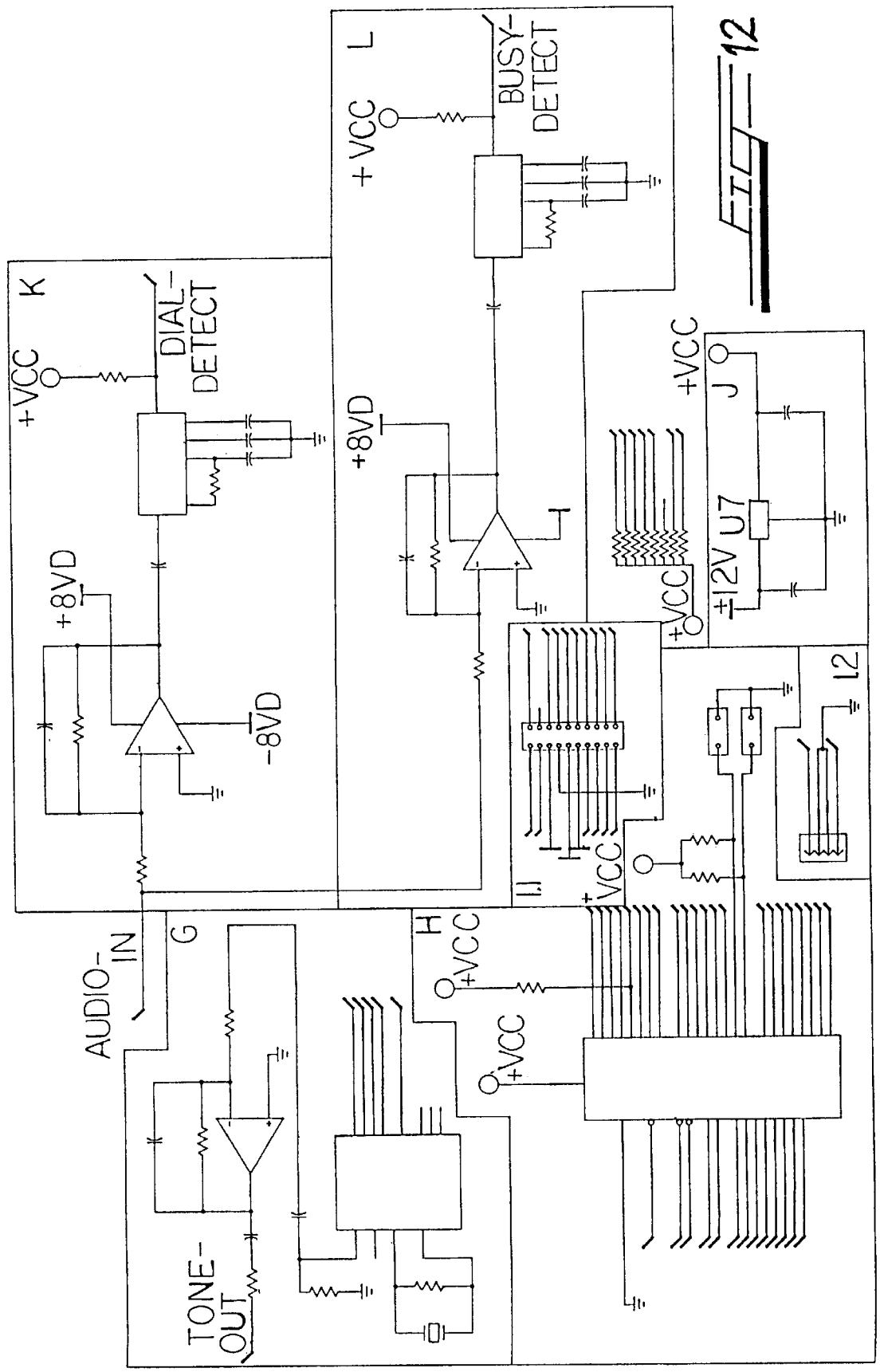

Referring now to FIG. 12, the part of the schematic of FIG. 12 labeled "G" is the DTMF tone generator, which is composed of U4, a DTMF tone generator, and ¼ of U1 used as an output amplifier. To generate a DTMF tone, first a four bit code is presented to the input pins labeled "DTMF0-OUT", "DTMF1-OUT", "DTMF2-OUT" and "DTMF4-OUT" in U4. Then, while keeping the four bit code, the enable signal labeled "DTMF-OUT" is changed from Low to HI level, thus allowing the tone to be generated. The audio is output at "TONE-OUT" after the audio had been amplified by U1:C. To stop the tone, the "DTMF-OUT" signal is returned to low level.

The section of the schematic of FIG. 12 labeled "H" is the input/output port, the I/O Port IC labeled U8. This integrated circuit is used by the microcontroller of the cellular, or cellular-like, interface board to read the input data and to control all of the output of the telemaintenance module. Ports A and C are input ports, while port B is an output port. Jumper J4 is the selector for the automatic periodic test with possible selections of 12 or 24 hours. J5 is used as an enable for the call to the "automatic answer".

The sections of the schematic of FIG. 12 labeled "I.1" and "I.2" are the power, data and control connectors, and contain J2, a 2 by 10 male header connector used to bring power, as well to send and receive data to the I/O Port. It also includes a 4 pin header connector for the external LED used to show the status of the test, and an external push button used to manually activate the test. The section of the schematic of FIG. 12 labeled "J" is the power regulator, and has U7, a 5 Volt fix-positive regulator that supplies the voltage necessary for the digital circuits.

The telemaintenance module 10 contains six single tone detectors used for testing the receiving audio path, frequency and timing cadence of ROH, Dial, Busy and Congestion tones. Each of the tone detectors is composed of an operational amplifier and a single tone detector IC. The input of the Opamp is connected to line "AUDIO-IN". The frequency of detection is set by a resistor located between pin 5 and 6 and a capacitor located between pin 6 and ground. When a valid tone matches the programmed tone by the RC, the tone detector output pin is forced from HI to Low.

Section "K" of FIG. 12 shows the dial-tone detector circuit. When a valid dial tone is present at the input of U3, the "DIAL-DETECT" line is forced to go Low. Section "L" shows the busy-tone detector circuit. When a valid busy tone is present at the input of U6, the "BUSY-DETECT" line is forced to go Low.

Figure 13:
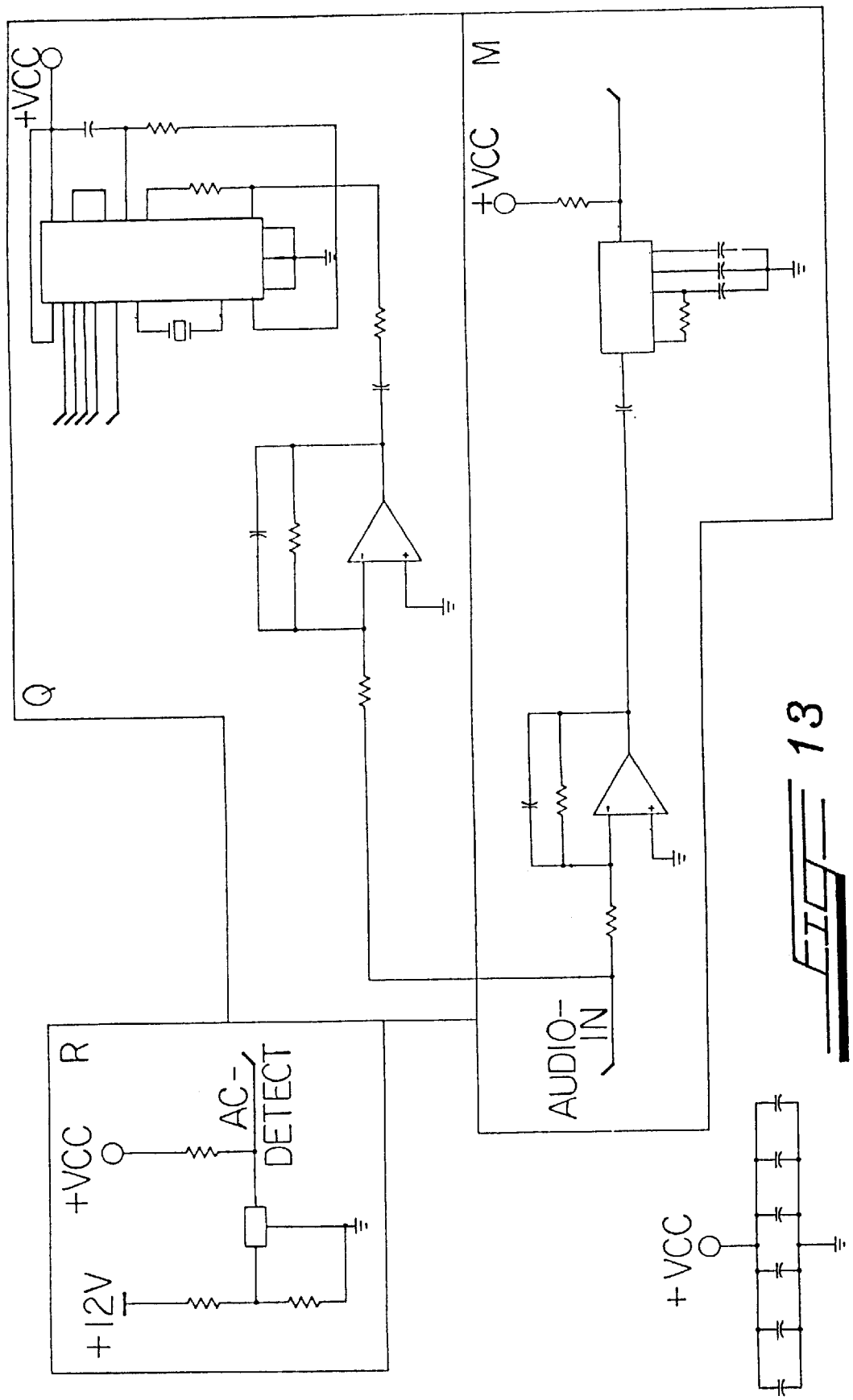

Section "M" of FIG. 13 shows a 400 Hz. tone-detector circuit. When a valid 400 Hz. tone is present at the input of U14, the "400-DETECT" line is forced to go Low.

Figure 14:
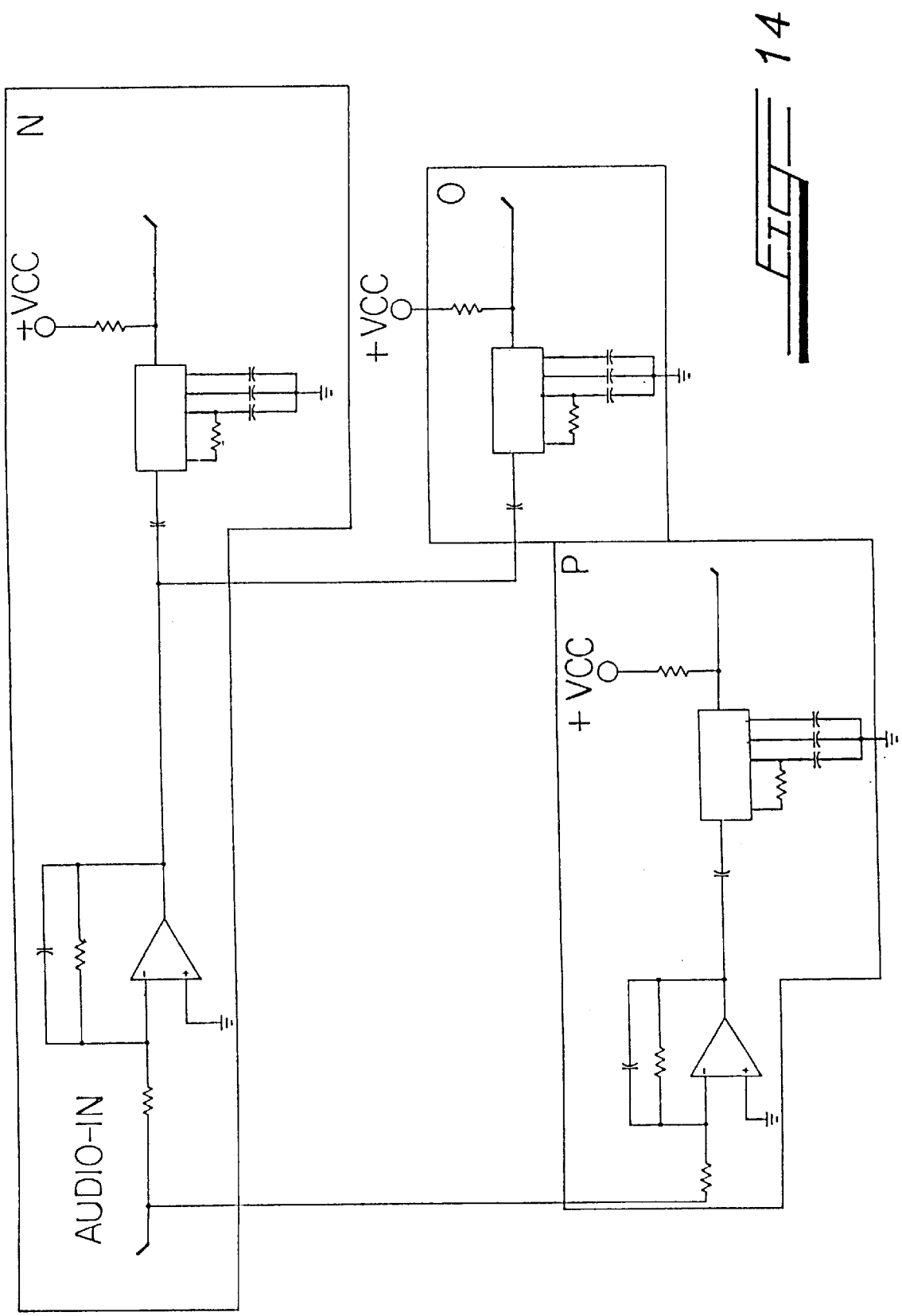

Section "N" of FIG. 14 shows a 800 Hz. tone-detector circuit. When a valid 800 Hz. tone is present at the input of U13, the "800-DETECT" line is forced Low. Section "O" shows a 1020 Hz. tone-detector circuit. When a valid 1020 Hz. tone is present at the input of U16, the "1020-DETECT" line is forced Low. Section "P" shows a 12 KHz. tone-detector circuit. When a valid 12 KHz. tone is present at the input of U12, the "12 KHz-DETECT" line is forced Low.

Section "Q" of FIG. 13 shows a DTMF tone decoder, which is composed of U11, a DTMF tone detector and ¼ of U1 used as an input pre-amplifier. When a valid DTMF tone is present at the input pin (IN-), the control line "DTMF-STROBE" is forced Low, while the IC is decoding. After the tone has been decoded, a four bit code is output to pins labeled "DTMF0-IN", "DTMF1-IN", "DTMF2-IN" and "DTMF4-IN" in U11. The control line "DTMF-STROBE" is then returned to HI again. Section R is an AC monitor, having U10, a 4.5V under-voltage detector. Resistors R17 and R33 form a voltage divider that will make U10 sense voltage under 13 volts instead of 4.5 volts. The circuit works on the assumption that when the supply voltage comes from the power supply, a 14V is present at the entrance of the telemaintenance module. On the event of an AC power failure, the voltage drops to the battery back-up level, which is not greater than 13 volts. The circuit will detect the drop, and U10 will drive line labeled "AC-DETECT" to Low.

Figure 16:
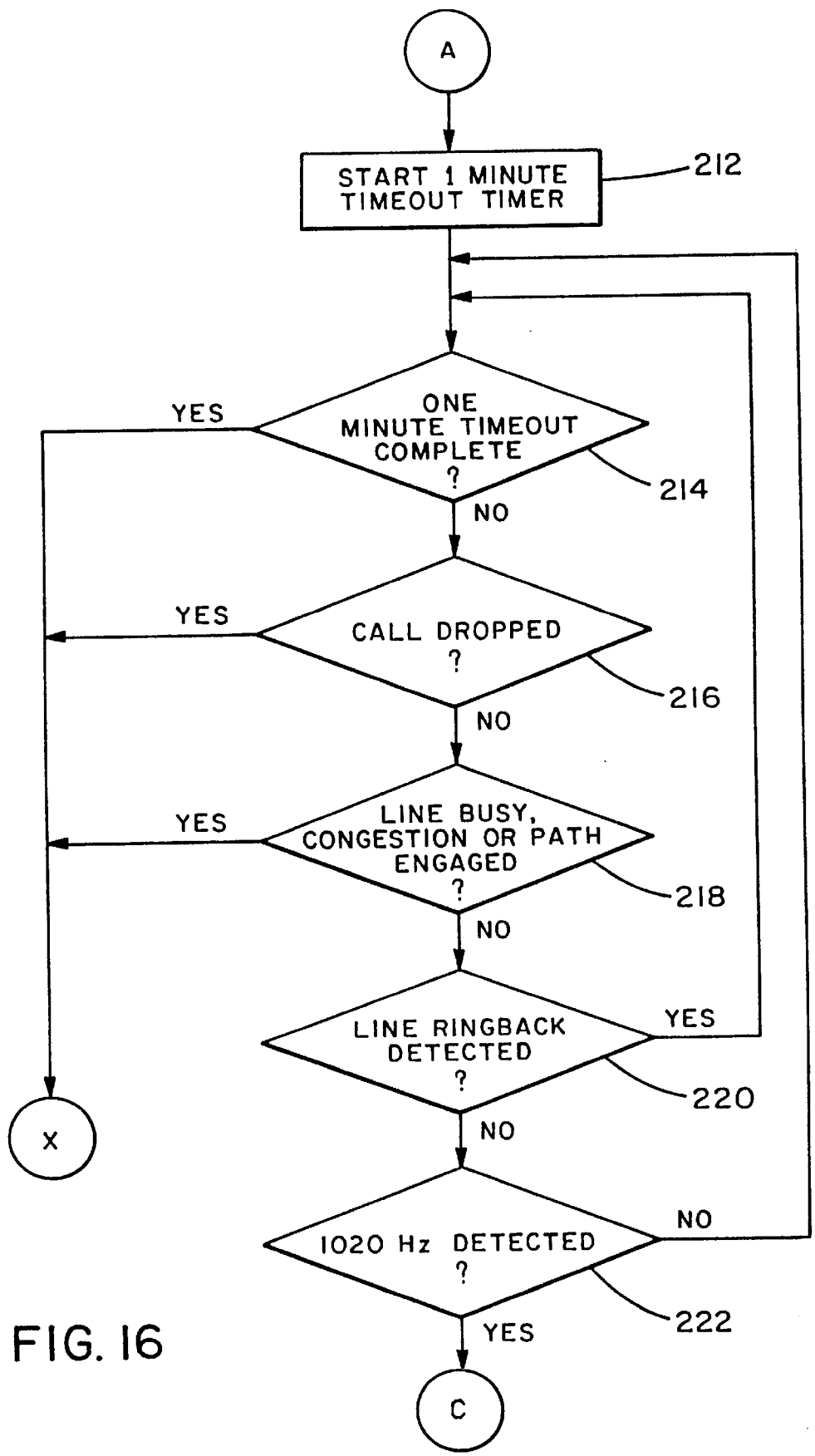
Figure 17:
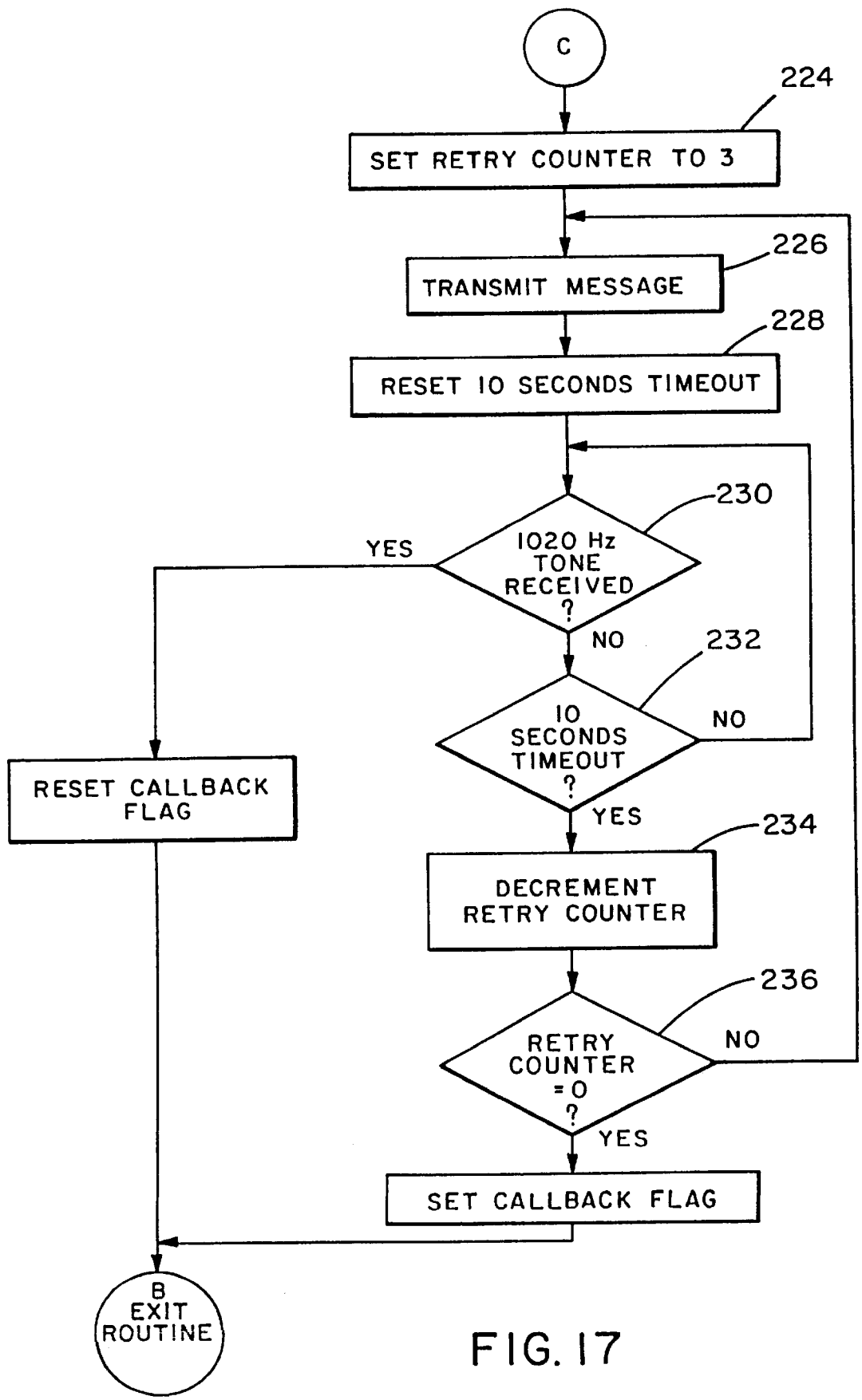
Figure 18:
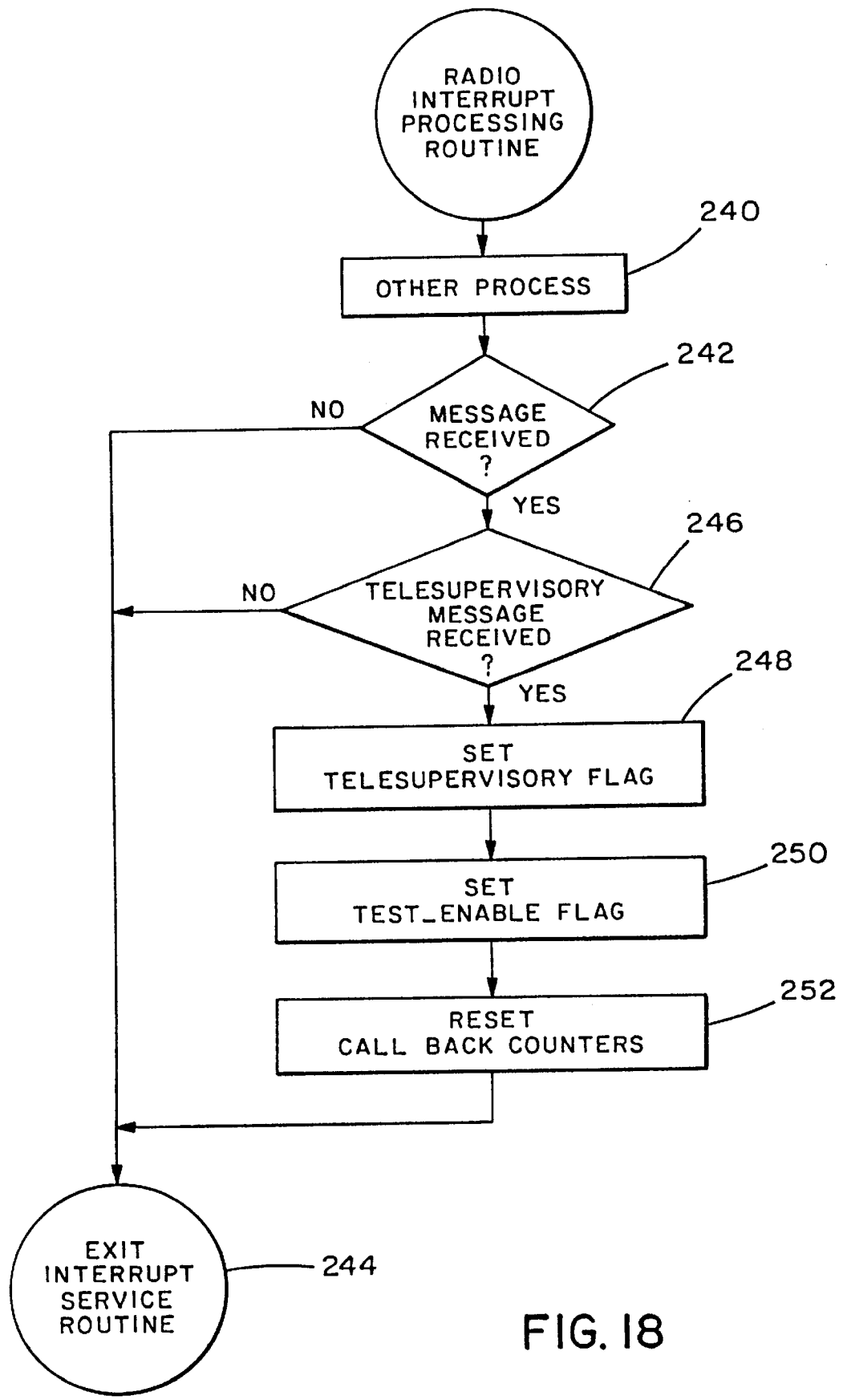
FIG. 18 is a flow chart showing the procedure when the testing of the of the cellular or cellular-like interface, with associated equuipment, is initiated by the remote telemaintenance center.
Figure 19:
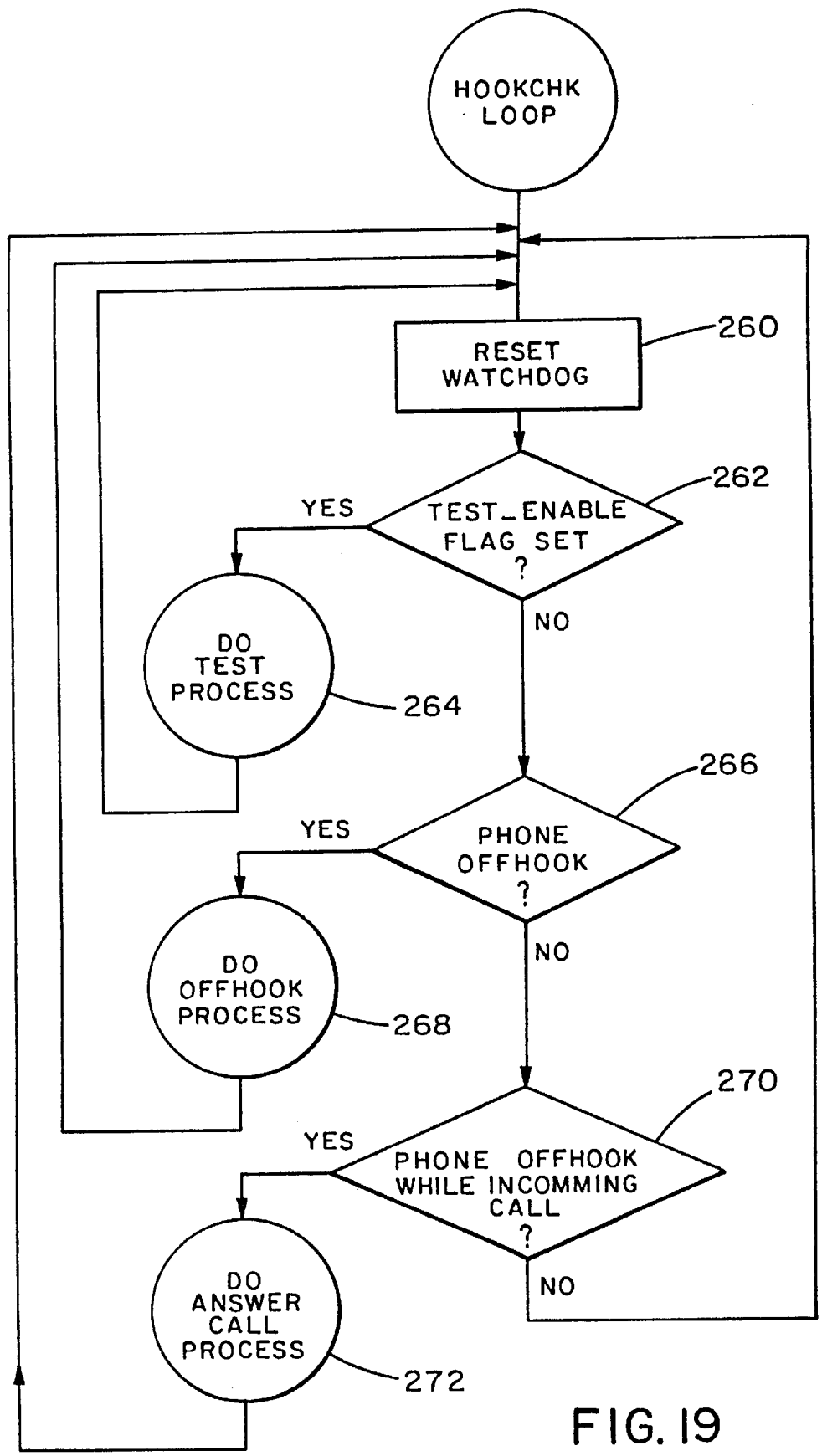
FIG. 19 is a flow chart showing the main-loop status verification routine.

Referring to FIGS. 15–19, there are shown in FIGS. 16–18 the flow charts for use in reporting the results of the self-diagnostic tests to the remote, central telemaintenance center, while there is shown in FIG. 19 a flow chart for initiating the self-diagnostic testing by the remote, central telemaintenance center.

Referring to FIG. 15, starting at the top (block 200) this is the entry point of the telemaintenance center calling routine. In STEP 1 (block 202), the transmission retry count variable is set to 3. This count determines the number of times a transmission is sent to the Telemaintenance Center before aborting the call. In STEP 2 (block 204), the call calls incomplete bit is reset. This clears any previous pending call, assuming a previous call was in progress and did not complete, setting a call-back flag. In STEP 3 (decision block 206), before calling the telemaintenance center, the system's service flag is checked. If there is a NO-SERVICE condition, the call aborts, setting the call_back flag. In STEP 4 (block 208), the telemaintenance center telephone number is recalled from the transceiver memory. In STEP 5 (block 210), the program instructs the radio to establish the call. Referring to FIG. 16, in STEP 8 (block 212), a counter/timer is set at the maximum time (timeout) the program will wait before dropping the call when a transmission/reception error occurs from the telemaintenance center. In STEP 10 (block 216), the NO-SERVICE and INUSE flags are tested to see if the call has been dropped. If the call has been dropped, the program transfers execution to STEP 6 (block 211) of FIG. 15. In Step 11 (block 218), and after receiving some signal on the receive audio channel, the signal received is checked for specific cadences like BUSY, and then the call is aborted, transferring execution to STEP 7, for the EXIT ROUTINE (see FIG. 15). In STEP 12 (block 220), and after receiving some signal on the receive audio channel, the signal received is checked for the cadence of the signal RINGBACK. If the RINGBACK signal is detected, the program transfers execution back to STEP 9 (block 214) to check to see if the one-minute timeout has been completed before entering the EXIT ROUTINE. In STEP 13 (block 222), the signal is checked for the presence of a 1020 Hz tone. If the tone is present for at least 100 ms, the program transfers execution to STEP 14 in FIG. 17 for the start of the message-sending routine. In STEP 14 (block 224, FIG. 17), a transmission retry count down variable is set to 3. This counter determines the maximum number of retransmissions to the telemaintenance center. In STEP 15 (block 226), the program transmits the message to the telemaintenance center. In STEP 16 (block 228), a 10 second timeout counter is set to zero. This counter determines that the program will wait 10 seconds for the acknowledgement-tone (1020 Hz) from the Telemaintenance Center. If this tone is not received within 10 seconds (STEP 16, block 232), the program continues with STEP 19. In STEP 19 (block 234), the transmission retry counter (Initially set at 3) is decremented. In STEP 20 (block 236), this counter is compared against zero. If the value of the counter is zero, the call-back flag is set, and then the program transfers execution to STEP 7 for carrying out the EXIT ROUTINE. In STEP 17 (decision block 230), if after transmitting the message a 1020 Hz tone is received from the telemaintenance center, meaning a message-received acknowledgement, the call_back flag is reset, ending the call successfully.

Referring to FIG. 17, the flow chart for the operation of the system of the invention by the initiation of the self-diagnostic testing by the remote telemaintenance center is shown. The objective of STEP 23 (block 240) is to denote that the Radio Interrupt Processing Routine does other tasks than the task described hereinbelow. These tasks are associated with the basic interface functions. In STEP 24 (decision block 242) a message-completion bit is checked. If a message is not received, the program transfers execution to STEP 29 (block 244), where the interrupt servicing routine is carried out. In STEP 25 (block 246), the incoming data byte of the radio is compared against the remote telesupervisory test activation code, sent by the telemaintenance center across the system. If the telesupervisory test activation code is received from the telemaintenance center, the program executes STEP 26 (block 248), where a flag is set on the call_back variable to indicate that the test has been initiated by the telemaintenance center. In STEP 27 (block 250), the test_enable flag is set to enable the test process. In STEP 28 (block 252), the variables associated with the test results are pre-defined to an initial state before the self-diagnostic test starts.

Referring to FIG. 19, there is shown the HOOKCHK routine for the verificaton of the status flags. The objective of STEP 30 (block 260) is to RESET the watch_dog timer to prevent CPU-reset. In STEP 31 (decision block 262), the test_enable flag is tested. If the test_enable flag is set to 1, meaning that the test has been enabled (which is set by a manual, timer-automatic or telesupervisory), the program branches to the DO-TEST process STEP 34 (block 264). After executing the DO-TEST process, the program returns to the HOOKCHK loop. In STEP 32 (decision block 266), the OFFHOOK flag is tested. If the OFFHOOK flag is set to 1, meaning that the telephone has been OFF-Hooked, the program branches to the OFFHOOK process (STEP 35, block 268). After exiting the OFFHOOK process, the programs return to the HOOKCHK loop. In STEP 33 (decision block 270), the FANSWER flag is tested. If the FANSWER flag is set, meaning that an incoming call has been received and that the telephone has been OFFHOOK, the program branches to the RING_ANSWER process (STEP 36, block 272). After exiting the RING_ANSWER process, the programs return to the HOOKCHK loop.

The following is a listing of the source code for performing self-diagnostics of the invention, followed by the source code for performing the reporting of the self-diagnostic test-results to the remote, central telemaintenance center, and for the initiation of the self-diagnostic testing by the remote, central telemaintenance center.

What we claim is:

1. In an apparatus for testing the proper functioning of a cellular, or cellular-like, transceiver and a cellular, or cellular-like, interface unit operatively coupled to said cellular transceiver, said apparatus comprising a cellular, or cellular-like, transceiver and a cellular, or cellular-like, interface unit operatively coupled to said cellular transceiver, and a land-type telephone device directly coupled to said cellular, or cellular-like, interface unit, said interface unit coupling said land-type telephone device to said cellular, or cellular-like, transceiver, whereby said land-type telephone device is coupled for use with the cellular, or cellular-like, system, the improvement comprising:

said apparatus comprising auto-diagnostic means coupled to said interface unit for generating signals for testing the operation of said cellular, or cellular-like, interface unit;

remote-testing initiation means for generating a signal for initiating in said auto-diagnostic means the initiation of the testing of the proper functioning of the the cellular, or cellular-like, interface unit operatively coupled to said cellular transceiver; and signal-responsive means associated with said auto-diagnostic means responsive to said signal from said remote-testing initiation means for starting the testing process of said auto-diagnostic means.

2. The apparatus according to claim 1, further comprising remote-reporting means operatively associated with said auto-diagnostic means for reporting data representing the results of the test of said auto-diagnostic means to a remote telemaintenance center by means of said cellular, or cellular-like, transceiver.

3. The apparatus according to claim 2, further comprising a remote telemaintenance center which receives said test-results data caused to be sent by said remote-reporting means, said remote telemaintenance center comprising means for receiving and processing said test-results data.

4. The apparatus according to claim 3, wherein said remote telemaintenance center comprises signal means for answering said remote-reporting means for indicating that the test-results data should be sent.

5. The apparatus according to claim 4, wherein said remote telemaintenance center comprises signal means for answering said remote-reporting means for indicating that the test-results data have been successfully received.

6. The apparatus according to claim 5, wherein each said signal means comprises means for generating a 1020 Hz. tone; said remote-reporting means comprising signal-receiving means for receiving said 1020 Hz. tone.

7. The apparatus according to claim 5, wherein said remote-reporting means comprises means for retrying the transmission of said test-results data; said means for retrying comprises means for limiting the number of attempts of retrying the transmission of said test-results data.

8. The apparatus according to claim 2, wherein said remote-reporting means comprises means for establishing a call to the telephone number of said remote telemaintenance center via the cellular, or cellular-like, network, and means for retrying to establish said call if a first attempt has failed.

9. The apparatus according to claim 2, wherein said remote telemaintenance center comprises means for sending a signal via the cellular, or cellular-like, network, to said remote-reporting means for causing said remote-reporting means to actuate said auto-diagnoctic means in order to perform a self-diagnostic test; said remote-reporting means having signal-receiving means for receiving said test-initation signal.

10. The apparatus according to claim 9, wherein said remote-reporting means comprises means for establishing a call to the telephone number of said remote telemaintenance center via the cellular, or cellular-like, network, and means for retrying to establish said call if a first attempt has failed.

11. The apparatus according to claim 1, wherein said auto-diagnostic means comprises means for simulating the functions performed by a standard, land telephone-like instrument for generating in said cellular, or cellular-like, interface unit respective, corresponding responses in said cellular, or cellular-like, interface unit, in order to determine if said cellular, or cellular-like, interface unit is operating correctly.

12. The apparatus according to claim 1, wherein said auto-diagnostic means comprises means for generating an off-hook signal to said cellular, or cellular-like, interface unit.

13. The apparatus according to claim 1, wherein said auto-diagnostic means comprises means for detecting the presence of a dial-tone signal generated from said cellular, or cellular-like, interface unit in response to said generation of said off-hook signal.

14. The apparatus according to claim 1, wherein said auto-diagnostic means comprises means for generating an on-hook signal to said cellular, or cellular-like, interface unit.

15. The apparatus according to claim 1, wherein said auto-diagnostic means comprises means for simulating the presence of an incoming telephone call to said transceiver in order to cause said cellular, or cellular-like, interface unit to actuate its ring generator; said auto-diagnostic means comprising means for detecting the ring-signal produced thereby.

16. The apparatus according to claim 1, wherein said auto-diagnostic means further comprises means for generating an off-hook signal to said cellular, or cellular-like, interface unit during the time that said cellular, or cellular-like, interface unit is generating its ring-signal, in order to determine that the cellular, or cellular-like, interface unit properly disconnects the ring-signal upon the answering of an incoming telephone call.

17. The apparatus according to claim 1, wherein said auto-diagnostic means comprises means for generating an outgoing telephone call through the cellular, or cellular-like, telephone network, when said cellular, or cellular-like, interface unit is coupled to a transceiver, and back to said cellular, or cellular-like, transceiver, whereby said diagnostic means causes said cellular, or cellular-like, transceiver to make a telephone call to itself; said auto-diagnostic means further comprising means for detecting the generation of a busy-signal by the cellular, or cellular-like, transceiver in response to said telephone call; said means for generating an outgoing telephone call calling the telephone number which has been assigned to the transceiver coupled to said cellular, or cellular-like, interface unit.

18. The apparatus according to claim 1, wherein said auto-diagnostic means comprises means for monitoring and reporting the proper functioning of said interface unit to said off-site location by means of said remote-reporting means.

19. A method of remotely testing for the proper operation of a cellular, or cellular-like, interface unit by means of a diagnostic unit, which cellular, or cellular-like, interface unit is capable of being coupled to a land-type telephone or telephone-like instrument, said method comprising:

(a) sending a test-initiation signal from an off-site location to the diagnostic unit;

(b) in response to said step (a), carrying out the testing of the cellular, or cellular-like, interface unit by means of the diagnostic unit;

(c) transforming the test-results into data that is capable of being sent over the cellular, or cellular-like, network;

(d) sending the test-results data to an off-site monitoring center by means of the cellular, or cellular-like, transceiver; and prior to said step (d), generating an acknowledgment signal from the off-site monitoring center to the diagnostic unit indicating establishment of data connection;

said step (b) comprising monitoring the functions performed by said interface unit;

said step of monitoring comprising: simulating the functions performed by a communications device for generating in said interface unit respective, corresponding responses in said interface unit, in order to determine if said interface unit is operating correctly.

20. The apparatus according to claim 1, wherein said auto-diagnostic means comprises at least one of:

a first means for generating an off-hook signal to said cellular, or cellular-like, interface unit; second means for detecting the presence of a dial-tone signal generated from said cellular, or cellular-like, interface unit in response to said generation of an off-hook signal; third means for generating an on-hook signal to said cellular, or cellular-like, interface unit; fourth means for simulating the signals of an incoming telephone call to said transceiver in order to cause said cellular, or cellular-like, interface unit to actuate its ring generator; fifth means for detecting the ring-signal produced by said fourth means; sixth means for generating an outgoing telephone call through the cellular, or cellular-like, telephone network, when said cellular, or cellular-like, interface unit is coupled to a transceiver, and back to said cellular, or cellular-like, transceiver, whereby said diagnostic means causes said cellular, or cellular-like, transceiver to make a telephone call to itself; seventh means for detecting the generation of a busy-signal by the cellular, or cellular-like, transceiver in response to said sixth means.

* * * * *